US009964956B2

(12) United States Patent
Watabe et al.

(10) Patent No.: US 9,964,956 B2
(45) Date of Patent: May 8, 2018

(54) OPERATING ENVIRONMENT INFORMATION GENERATING DEVICE FOR MOBILE ROBOT

(71) Applicant: HONDA MOTOR CO., LTD., Tokyo (JP)

(72) Inventors: Tomoki Watabe, Saitama (JP); Hiroyuki Kaneko, Saitama (JP); Minami Asatani, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 15/196,627

(22) Filed: Jun. 29, 2016

(65) Prior Publication Data
US 2017/0010620 A1    Jan. 12, 2017

(30) Foreign Application Priority Data

Jul. 8, 2015   (JP) .................................. 2015-137007

(51) Int. Cl.
G05B 19/04    (2006.01)
G05B 19/18    (2006.01)
G05D 1/02     (2006.01)
B25J 19/02    (2006.01)

(52) U.S. Cl.
CPC .......... *G05D 1/0248* (2013.01); *B25J 19/022* (2013.01); *B25J 19/023* (2013.01); *G05D 2201/0217* (2013.01); *Y10S 901/01* (2013.01)

(58) Field of Classification Search
CPC ...... B25J 19/022; B25J 19/023; B25J 19/024; B25J 13/08; G05D 1/0248; G05D 2201/0217; G05D 1/02; Y10S 901/01; B62D 57/032
See application file for complete search history.

(56) References Cited

U.S. PATENT DOCUMENTS

| 5,535,306 A * | 7/1996 | Stevens | B25J 9/1692 700/254 |
| 7,337,040 B2 * | 2/2008 | Takenaka | B25J 13/088 180/8.1 |
| 8,310,684 B2 * | 11/2012 | Lee | G06K 9/00664 356/614 |
| 8,747,188 B2 * | 6/2014 | Maloney | B24B 27/0038 451/5 |
| 2009/0312867 A1 * | 12/2009 | Hasegawa | B62D 57/032 700/245 |

(Continued)

FOREIGN PATENT DOCUMENTS

JP    2009-223628    10/2009

*Primary Examiner* — Rachid Bendidi
(74) *Attorney, Agent, or Firm* — Rankin, Hill & Clark LLP

(57) ABSTRACT

An operating environment information generating device is provided which estimates, upon contact of a mobile robot (1) with a surface portion of an external object, a position and posture of the contact surface on the basis of a posture state of the robot (1), and, in the case where the degree of difference between the estimates and a position and posture of the surface portion of the external object indicated by environment information created based on measurement data by an external-object recognition sensor (46, 47) is large, corrects the environment information at the contact location in such a way as to make the position and posture of the contact surface match the estimates.

9 Claims, 14 Drawing Sheets

(56) References Cited

U.S. PATENT DOCUMENTS

| | | | |
|---|---|---|---|
| 2012/0220194 A1* | 8/2012 | Maloney | B24B 27/0038 451/5 |
| 2012/0303162 A1* | 11/2012 | Orita | B25J 9/1664 700/275 |
| 2013/0178983 A1* | 7/2013 | Watabe | G05D 3/12 700/258 |
| 2014/0088746 A1* | 3/2014 | Maloney | B25J 9/1684 700/97 |
| 2014/0235141 A1* | 8/2014 | Maloney | B24B 27/0038 451/5 |

* cited by examiner

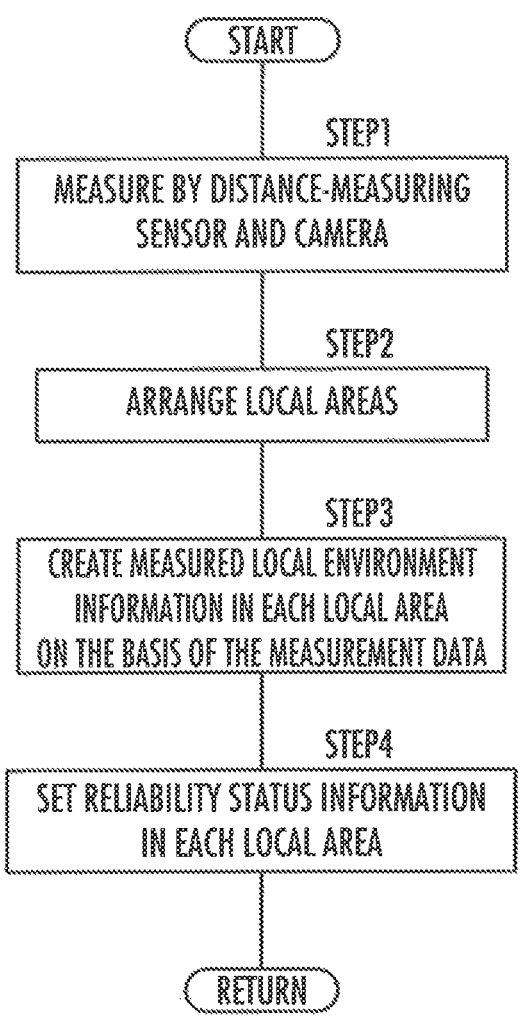

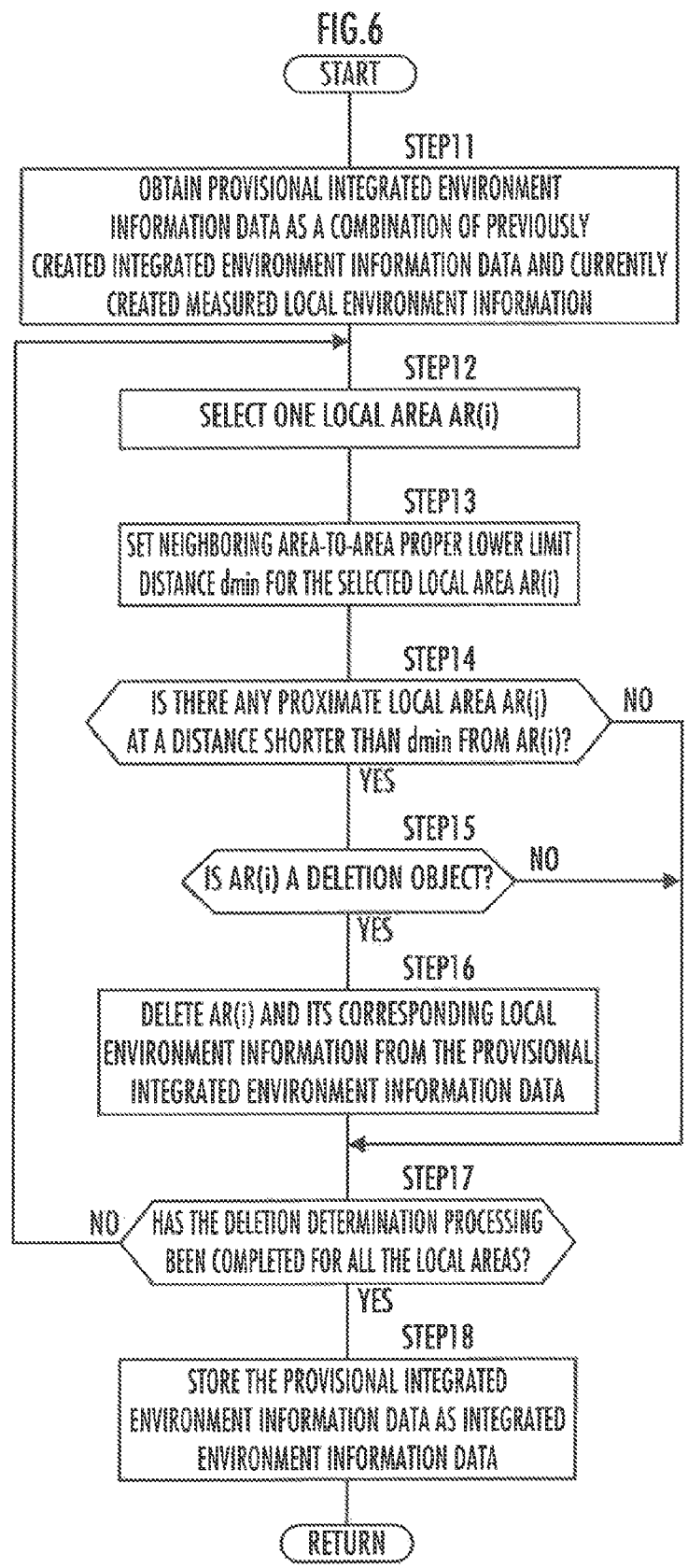

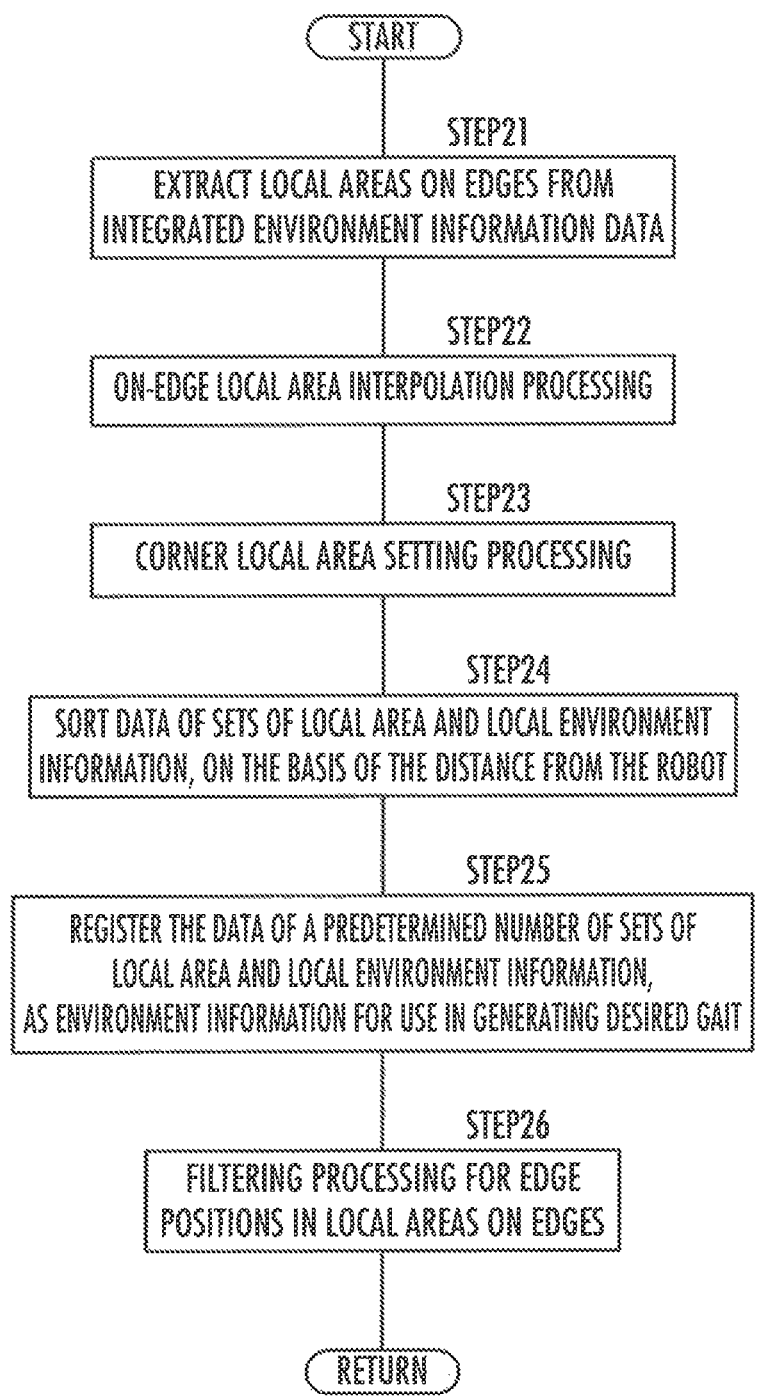

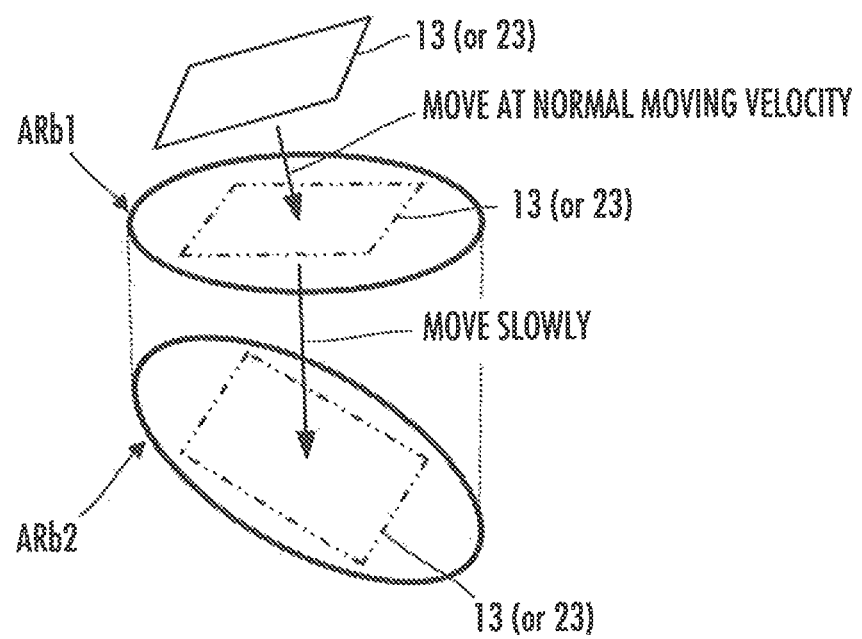

OPERATING ENVIRONMENT INFORMATION GENERATING DEVICE FOR MOBILE ROBOT

BACKGROUND OF THE INVENTION

Field of the Invention

The present invention relates to a device for generating environment information on an operating environment of a mobile robot as information for use in controlling operations of the mobile robot.

Description of the Related Art

For causing a mobile robot to move in a variety of environments, environment information indicating a spatial arrangement state of a surface portion of an external object existing in an operating environment of the mobile robot, such as a floor, ground, or wall surface, installed article etc., is required for operation control of the mobile robot. (The environment information specifically indicates a spatial position and posture of a flat portion included in the surface portion of the external object, or geometry of the surface portion, or a position and direction of an edge formed on the surface portion.)

As a technique of generating such environment information, generally, a technique of generating environment information by measuring an arrangement state of a surface portion of an external object using external-object recognition sensor such as a laser range finder, camera, or the like (capable of measuring a distance to each portion of the external object) mounted on a mobile robot is conventionally known, as described for example in Japanese Patent Application Laid-Open No. 2009-223628 (hereinafter, referred to as "Patent Literature 1").

SUMMARY OF THE INVENTION

Incidentally, in the case where the operating environment in which a mobile robot is caused to move comprises a rough or irregular ground, for example, a foot of a leg link of the mobile robot that is lowered from in the air to land on the ground during the traveling of the mobile robot may cause collapsing of geographic features of the spot where the robot has landed.

In such a situation, in order to cause the mobile robot to move near the spot where it landed, it is necessary to acquire environment information that indicates actual geographic features of the landing spot after the same have collapsed as described above.

The surface portion of the ground at the landing spot, however, is covered by the foot or the like of the mobile robot. This makes it difficult to appropriately measure the state of the surface portion of the ground at the landing spot using the laser range finder or other external-object recognition sensor mounted on the mobile robot.

Therefore, with the conventional technique as seen in Patent Literature 1, when there occurs a collapse in geographic features at the landing spot of the foot or the like of the mobile robot, it is often the case that it becomes difficult to properly recognize the actual state of the surface portion of the ground at the landing spot and, accordingly, it becomes difficult to appropriately operate the mobile robot in the vicinity of the landing spot.

In view of the foregoing, it is an object of the present invention to provide an environment information generating device which is capable of quickly and appropriately estimating an arrangement state of a surface portion of an external object with which a mobile robot has been brought into contact during operation control of the mobile robot, even in the case where the state of the surface portion of the external object with which the mobile robot came into contact has changed from its state at the time of measurement.

An operating environment information generating device for a mobile robot according to the present invention is a device for achieving the object which generates, as information for use in operation control of the mobile robot, environment information indicating a spatial arrangement state of a surface portion of an external object existing in an operating environment of the mobile robot, wherein the device includes:

an environment information measuring/creating section which obtains measurement data according to the spatial arrangement state of the surface portion of the external object existing in a measuring object area in a surrounding of the mobile robot using an external-object recognition sensor mounted on the mobile robot and creates the environment information based on the measurement data;

a contact-surface position/posture estimating section which is operable, when the mobile robot comes into contact with the external object during the operation control of the mobile robot based on the environment information created by the environment information measuring/creating section, to obtain estimated contact-surface position/posture as estimates of actual position and posture of a contact surface of the mobile robot with the external object based on a posture state of the mobile robot at the time of the contact; and an environment information correcting section which compares position/posture before contact, representing a position and posture before contact with the mobile robot of a portion of the surface portion of the external object corresponding to the contact surface, indicated by the environment information created by the environment information measuring/creating section before the contact, with the estimated contact-surface position/posture obtained by the contact-surface position/posture estimating section, and, in a case where a degree of difference between the position/posture before contact and the estimated contact-surface position/posture is a predetermined amount or greater, corrects the environment information in at least the portion corresponding to the contact surface of the surface portion of the external object for which the environment information was created by the environment information measuring/creating section, in such a way as to conform to the estimated contact-surface position/posture (first aspect of the invention).

It should be noted that the "external object" in the present invention may include, not only floor and ground surfaces, but also walls and other objects.

According to the first aspect of the invention, as the device includes the contact-surface position/posture estimating section, even in the case where it is not possible to measure the actual position and posture of the contact surface of the mobile robot with the external object using the external-object recognition sensor, estimates of the actual position and posture of the contact surface, i.e. the estimated contact-surface position/posture, can be estimated on the basis of the posture state of the mobile robot at the time of contact of the mobile robot with the surface portion of the external object.

This is because the posture state of the mobile robot (specifically, the state indicated by the amount of displacement of each joint or the like) at the time of contact of the mobile robot with the surface portion of the external object is dependent on the actual position and posture of the contact surface.

In the first aspect of the invention, in the case where the degree of difference between the position and posture indicated by the environment information created by the environment information measuring/creating section before such contact, i.e. the position/posture before contact, and the estimated contact-surface position/posture is a predetermined amount or greater, the environment information correcting section corrects at least the environment information in the portion, corresponding to the contact surface, of the surface portion of the external object for which the environment information was created by the environment information measuring/creating section, in such a way as to conform to the estimated contact-surface position/posture.

It should be noted that the degree of difference described above may be expressed, for example, by a deviation in terms of position or a deviation in terms of posture between the position/posture before contact and the estimated contact-surface position/posture.

With this configuration, when the mobile robot comes into contact with an external object, even if the arrangement state (position or posture) of the surface portion of the external object at the contact surface of the mobile robot with the external object has changed from the state at the time when it was measured by the environment information measuring/creating section, the environment information indicating the changed arrangement state can be obtained quickly.

Thus, according to the first aspect of the invention, even in the case where a state of a surface portion of an external object with which a mobile robot has been brought into contact during operation control of the mobile robot has undergone a change from the state at the time of measurement, it is possible to quickly and appropriately estimate the arrangement state of the surface portion of the external object with which the mobile robot has been brought into contact.

In the first aspect of the invention, the mobile robot may adopt a configuration that includes a foot or a hand as a portion to be brought into contact with the surface portion of the external object. In this case, the operating environment information generating device of the present invention may be configured such that processing in the contact-surface position/posture estimating section and the environment information correcting section are executed when the foot or the hand comes into contact with the surface portion of the external object by the operation control of the mobile robot (second aspect of the invention).

According to the second aspect of the invention, the processing in the contact-surface position/posture estimating section and the environment information correcting section can be carried out when a foot or hand of the mobile robot comes into contact with (for example, it lands on) an external object (floor, ground, wall, etc.) as the foot or hand is moved for a traveling operation or the like of the mobile robot. It is therefore possible to carry out the processing in the contact-surface position/posture estimating section and the environment information correcting section during a normal operation of the mobile robot.

In the first or second aspect of the invention, it is preferable that the environment information created by the environment information measuring/creating section is configured by local environment information indicating a spatial arrangement state of the surface portion of the external object in a respective one of a plurality of local areas set with respect to the surface portion of the external object (third aspect of the invention).

With this configuration, the local environment information created by the environment information measuring/creating section includes environment information in only a local portion of the surface portion of the external object. Thus, the local environment information can be created easily and efficiently.

In the third aspect of the invention, it is preferable that the operating environment information generating device further includes an environment information storing section which stores a data group including the local environment information in the respective ones of the plurality of local areas, and that the data group stored in the environment information storing section includes the local environment information created at different times from one another by the environment information measuring/creating section (fourth aspect of the invention).

With this configuration, the local environment information in a plurality of local areas can be accumulated as the data group. It is thus possible to obtain environment information over a wide range in the operating environment of the mobile robot.

In the fourth aspect of the invention, it is preferable that the environment information storing section is configured to be operable, in a case where a degree of denseness of the local areas in the data group is a predetermined threshold value or higher, to evaluate a degree of reliability of the local environment information in respective ones of a plurality of local areas in an area with the high degree of denseness, and to erase, from the data group, among the plurality of local areas that is determined to be lower in the degree of reliability than the other local areas and the local environment information corresponding to that local area (fifth aspect of the invention).

With this configuration, it is possible to adjust the number of local areas included in the data group such that the degree of denseness of the local areas in the data group does not become excessively high. This can prevent the amount of information in the data group from becoming too large.

Further, in this case, the local area having a low degree of reliability and the corresponding local environment information are erased. This can prevent degradation in reliability of the data group.

In the fifth aspect of the invention, it is preferable that the environment information storing section is configured to evaluate the degree of reliability of the local environment information in each local area in the area with the high degree of denseness based on one or more parameters of: time of creation of the local environment information corresponding to the local area, the number of measurement points in which measurement was conducted by the external-object recognition sensor in the local area, dispersion of the measurements obtained by the external-object recognition sensor in the local area, and a distance from the external-object recognition sensor to the local area at a time when the measurement was conducted by the external-object recognition sensor in the local area (sixth aspect of the invention).

That is, in the case where the time of creation of local environment information for a certain local area is old, the local environment information may be inconsistent with the arrangement state of the surface portion of the external object in that local area at the present time. Therefore, it may be considered that local environment information for a local area created earlier is low in degree of reliability as compared to that created later (closer to the present time).

Further, it is highly likely that the measurement error in a certain local area is relatively large in the case where the number of measurement points in which the measurement was conducted by the external-object recognition sensor in the local area is small, or in the case where the dispersion of the measurements obtained by the external-object recognition sensor in the local area is large, or in the case where the distance from the external-object recognition sensor to the local area at the time when the measurement was conducted by the external-object recognition sensor in the local area is large. Therefore, it may be considered that the local environment information for the local area is low in degree of reliability in any of the above-described cases as compared to the case where the number of measurement points is large, the case where the dispersion of the measurements is small, or the case where the above-described distance is small.

Therefore, according to the sixth aspect of the invention, it is possible to appropriately evaluate the degree of reliability of the local environment information for each local area.

In the fifth aspect of the invention, it is preferable that the environment information storing section is configured to set the threshold value regarding the degree of denseness variably in accordance with a geometry of the surface portion of the external object in the area with the high degree of denseness or in a vicinity thereof (seventh aspect of the invention).

That is, in the case of bringing a contacting site (such as a foot or hand) of the mobile robot into contact with a surface portion of an external object, whether the contact may be made stably or not would be greatly affected by the geometry of the surface portion of the external object (geometry related to the largeness of a flat surface, the smoothness, the presence/absence of an edge, etc.). It is therefore preferable that the threshold value related to the degree of denseness (threshold value for determining whether the degree of denseness is high or not) is variably set as described above.

This makes it possible to adjust the degree of denseness of local areas in a pattern which is appropriate for the geometry of the surface portion of the external object. For example, the degree of denseness of local areas may be adjusted such that it is lowered in an area where there is a high possibility that a contacting site of the mobile robot can stably be brought into contact with the surface portion of the external object, and that it is increased in an area where the contact of the contacting site of the mobile robot with the surface portion of the external object may become unstable.

It becomes therefore possible, during the operation control of the mobile robot, to appropriately select a spot, on a surface portion of an external object, with which a contacting site, such as a foot or hand, of the mobile robot is brought into contact.

In the third through seventh aspects of the invention, the local environment information in each local area created by the environment information measuring/creating section may include, in a case where there is an edge in the local area, information indicating a position and direction of the edge. In this case, it is preferable that the operating environment information generating device further includes an edge information correcting section which is operable, in the case where a plurality of local areas are set by the environment information measuring/creating section on a same edge in the surface portion of the external object, to correct the information indicating the position or direction of the edge in each of the plurality of local areas on the edge, in accordance with the information indicating the position or direction of the edge in one or more local areas in the vicinity of the local area, to thereby reduce variation of the information indicating the position or direction of the edge in the respective ones of the local area and the local area(s) in a vicinity thereof (eighth aspect of the invention).

With this configuration, when a plurality of local areas are arranged on a same edge in the surface portion of the external object, even in the case where information indicating a position or direction of the edge created by the environment information measuring/creating section varies in the plurality of local areas due to measurement errors or the like, the information indicating the position or direction of the edge can be corrected to reduce such variation between the local areas adjacent to each other.

Further, in the third through seventh aspects of the invention, in a case where the local environment information in each local area created by the environment information measuring/creating section includes information indicating a position and direction of an edge as there is the edge in the local area, it is preferable that the operating environment information generating device further includes a corner position estimating section which is operable, in the case where a plurality of local areas are set by the environment information measuring/creating section on a respective one of two edges extending in different directions from each other in the surface portion of the external object, to calculate a position of intersection between an extended line of the edge in a local area on one of the two edges and an extended line of the edge in a local area on the other of the two edges, and to estimate the position of intersection as an existence position of a corner in the surface portion of the external object (ninth aspect of the invention).

With this configuration, even in the case where the local areas set by the environment information measuring/creating section do not include a local area corresponding to the position of a corner of edges, or even in the case where local environment information indicating the corner could not be created appropriately, it is possible to obtain the environment information indicating the existence position of the corner.

Accordingly, during the operation control of the mobile robot, a spot with which a contacting site (such as a foot or hand) of the mobile robot is to be brought into contact, for example, can be selected appropriately in such a way as to avoid the corner.

It should be noted that the ninth aspect of the invention can be combined with the eighth aspect of the invention.

BRIEF DESCRIPTION OF THE DRAWINGS

FIG. 5 is a flowchart illustrating the processing performed by the environment information measuring/creating unit;

FIG. 6 is a flowchart illustrating the processing performed by an environment information integration processing unit shown in FIG. 2;

FIG. 7 is a flowchart illustrating the processing performed by an environment information supplementary processing unit shown in FIG. 2;

FIG. 16 shows the manner of operation of a foot or hand of the mobile robot in the landing operation restricted mode.

DESCRIPTION OF THE PREFERRED EMBODIMENTS

Figure 1:
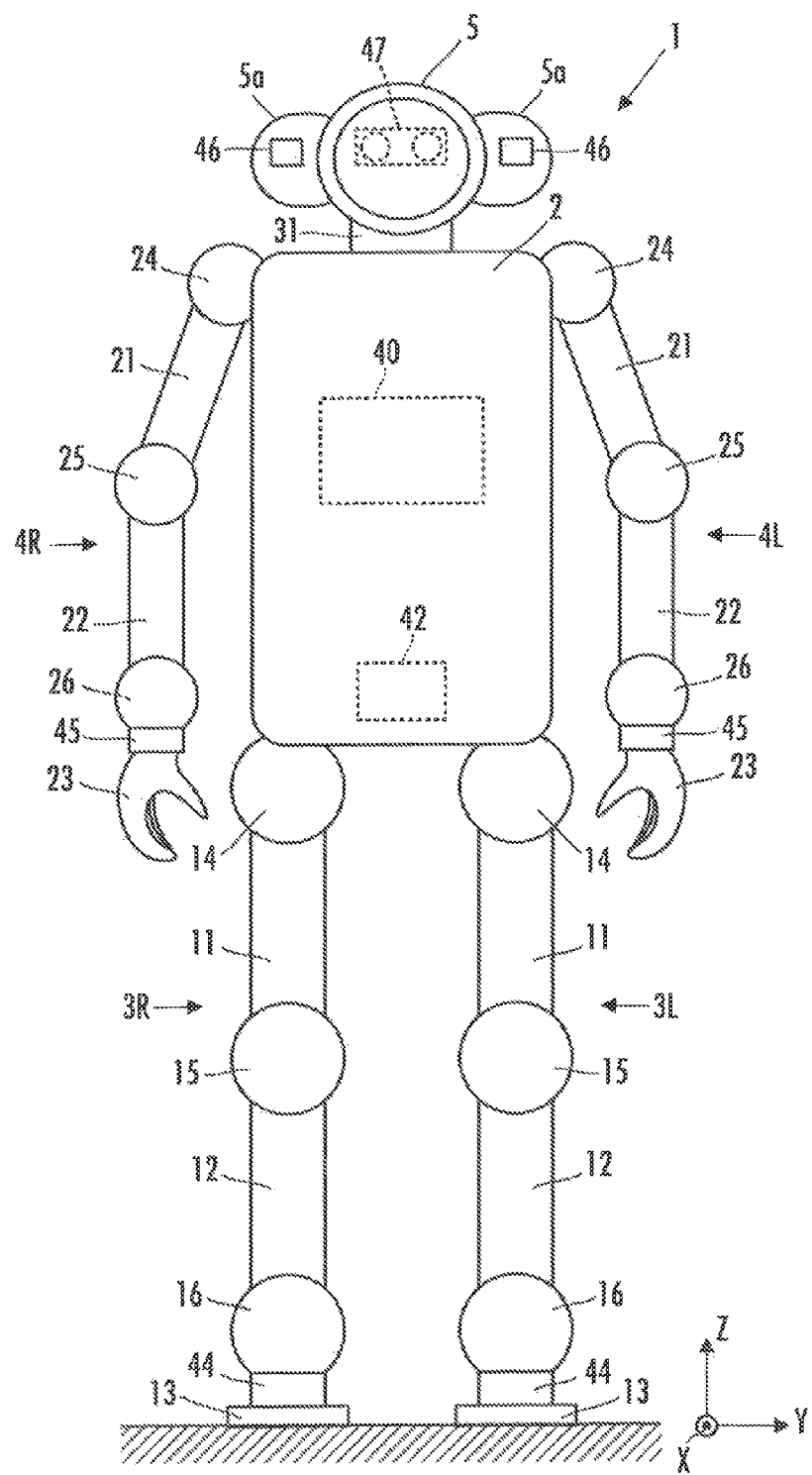
FIG. 1 shows a configuration of a mobile robot according to an embodiment of the present invention.

An embodiment of the present invention will be described below with reference to FIGS. 1 to 16. Referring to FIG. 1, a mobile robot of the present embodiment is a humanoid robot, by way of example. The mobile robot 1 (hereinafter, simply referred to as "robot 1") has a body 2, a pair of right and left (or, two) leg link mechanisms 3R, 3L which extend from the lower portion of the body 2, a pair of right and left (or, two) arm link mechanisms 4R, 4L which extend from the upper portion of the body 2, and a head 5.

In the description of the present embodiment, the reference symbols R and L for the leg link mechanisms 3R, 3L, etc. indicate the right side and left side, respectively, with respect to the front of the body 2 of the robot 1. The symbol R or L, however, will be omitted when there is no need to differentiate between the right and left.

Each leg link mechanism 3 is composed of three links 11, 12, and 13, corresponding respectively to the thigh, crus, and foot, which are joined via a hip joint mechanism 14, a knee joint mechanism 15, and an ankle joint mechanism 16 in this order from the body 2 side. Hereinafter, the links 11, 12, and 13 will be referred to as the thigh 11, crus 12, and foot 13, respectively.

The joint mechanisms 14, 15, and 16 of each leg link mechanism 3 are configured in such a manner that the foot 13, as a distal link of the leg link mechanism 3, moves with six degrees of freedom of motion, for example, with respect to the body 2.

For example, the hip joint mechanism 14 is configured with three joints (not shown) so as to have degrees of freedom of rotation about three axes in total of yaw, pitch, and roll axes. The knee joint mechanism 15 is configured with a single joint (not shown) so as to have a degree of freedom of rotation about the pitch axis (single axis), for example. The ankle joint mechanism 16 is configured with two joints (not shown) so as to have degrees of freedom of rotation about two axes in total of pitch and roll axes, for example.

In the description of the present embodiment, the "joint" means a rotary joint having a degree of freedom of rotation about a single axis, unless otherwise specified. For such a joint, one with a known structure having two members which can rotate relative to each other about an axis can be adopted.

Further, in the description of the present embodiment, the yaw, pitch, and roll axes mean an axis in an up-and-down direction (Z axis in FIG. 1), an axis in a right-and-left direction (Y axis in FIG. 1), and an axis in a front-and-back direction (X axis in FIG. 1), respectively, of the robot 1 in the state where the robot 1 is standing in an upright posture as shown in FIG. 1 (in the state where the body 2, the leg link mechanisms 3, and the arm link mechanisms 4 extend approximately in the up-and-down direction).

Each arm link mechanism 4 is composed of three links 21, 22, and 23, corresponding respectively to the upper arm, forearm, and hand, which are joined via a shoulder joint mechanism 24, an elbow joint mechanism 25, and a wrist joint mechanism 26 in this order from the body 2 side. Hereinafter, the links 21, 22, and 23 will be referred to as the upper arm 21, forearm 22, and hand 23, respectively.

The joint mechanisms 24, 25, and 26 of each arm link mechanism 4 are configured in such a manner that the hand 23, as a distal link of the arm link mechanism 4, moves with six degrees of freedom of motion, for example, with respect to the body 2, as in the case of the leg link mechanism 3.

For example, the shoulder joint mechanism 24 is configured with three joints (not shown) so as to have degrees of freedom of rotation about three axes in total of yaw, pitch, and roll axes. The elbow joint mechanism 25 is configured with a single joint (not shown) so as to have a degree of freedom of rotation about the pitch or roll axis (single axis), for example. The wrist joint mechanism 26 is configured with two joints (not shown) so as to have degrees of freedom of rotation about two axes in total of pitch and roll axes, for example.

It should be noted that the hand 23 may also include an open/close mechanism for a work by the hand 23, or a plurality of bendable and stretchable finger mechanisms.

The head 5 is attached on top of the body 2 via a neck joint mechanism 31. The neck joint mechanism 31 is configured with one, two, or three joints so as to have one or more degrees of freedom of rotation about one, two, or three axes, for example.

The above has outlined the mechanical structure of the robot 1 of the present embodiment. The robot 1 with such a structure can travel basically through operations of the right and left leg link mechanisms 3R and 3L (through the operation in biped gait in which the feet 13 each move in the air and then contact the ground repeatedly).

Alternatively, the arm link mechanisms 4R, 4L can be operated as leg link mechanisms besides the leg link mechanisms 3R, 3L for traveling of the robot 1. For example, the robot 1 can also travel through the operation in quadruped gait in which the distal portions (feet 13 and hands 23) of the four link mechanisms of leg link mechanisms 3R, 3L and arm link mechanisms 4R, 4L each move in the air and then contact the ground repeatedly.

Further, during the traveling of the robot 1 in the biped gait or the like, the hands 23 of the respective arm link mechanisms 4R, 4L can be brought into contact with a wall or an installed article, as appropriate.

Supplementally, each leg link mechanism 3 or each arm link mechanism 4 may be configured to have six or more degrees of freedom of motion, for example.

Further, the body 2 may be configured with two or more links which are joined through joints. For example, the body may be configured with two links of upper link and lower link which are joined via one or more joints.

The joints in each leg link mechanism 3 and each arm link mechanism 4 are not limited to the rotary joints; they may include prismatic joints.

The robot 1 may have a structure including no head 5 and no neck joint mechanism 31. The robot 1 may also have a structure including only one or neither one of the arm link mechanisms 4R, 4L.

Further, the robot 1 may have three or more leg link mechanisms. In the case where the arm link mechanisms 4R, 4L are operated as the leg link mechanisms in addition to the leg link mechanisms 3R, 3L for traveling of the robot 1, the robot 1 may be considered as a robot which essentially has four leg link mechanisms.

A configuration related to operation control of the robot 1 will now be described.

Figure 2:
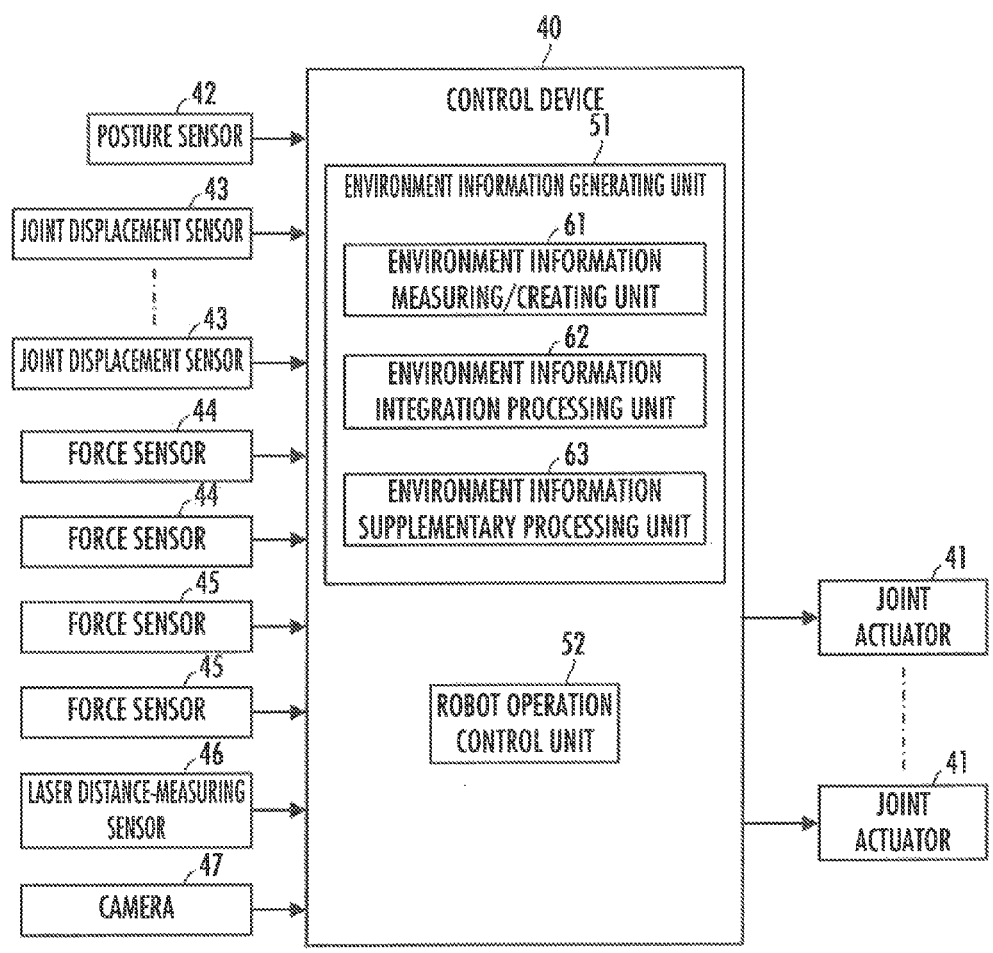
FIG. 2 is a block diagram showing a configuration related to the operation control of the mobile robot in FIG. 1.

As shown in FIG. 2, the robot 1 is provided with a control device 40 which carries out a variety of processing for operation control of the robot 1, joint actuators 41 for driving corresponding joints, and various sensors. It should be noted that the control device 40 includes the function as the operating environment information generating device of the present invention.

A joint actuator 41 is disposed for each joint. Each joint actuator 41 is made up of an electric motor, for example. Each joint actuator 41 drives the corresponding joint by transmitting a driving force to the joint via a speed reducer or the like (not shown).

The sensors mounted on the robot 1 include: a posture sensor 42 for detecting a posture (spatial orientation) of a link, for example the body 2, of the robot 1; a joint displacement sensor 43 for detecting the amount of displacement (rotational angle) of a corresponding joint of the robot 1; a force sensor 44 for detecting external force (translational force and moment) that the foot 13 of the corresponding leg link mechanism 3 receives from an external object with which the foot 13 is brought into contact; a force sensor 45 for detecting external force (translational force and moment) that the hand 23 of the corresponding arm link mechanism 4 receives from an external object with which the hand 23 is brought into contact; and a laser distance-measuring sensor 46 and a camera 47 serving as external-object recognition sensors.

The posture sensor 42 is a sensor (see FIG. 1) which is mounted on the body 2 so as to be able to detect the posture and its temporal change rate (angular velocity) of the body 2 by a strapdown system, for example. The posture sensor 42 is made up of a gyro sensor which detects angular velocities in three axes, and an acceleration sensor which detects translational accelerations in the three axes.

A joint displacement sensor 43 is disposed for each joint. Each joint displacement sensor 43 is made up of a rotational angle sensor such as a rotary encoder, potentiometer, or the like.

A force sensor 44 is disposed for each leg link mechanism 3. For example as shown in FIG. 1, each force sensor 44 is made up of a six-axis force sensor which is interposed between the ankle joint mechanism 16 and the foot 13 in a leg link mechanism 3. A force sensor 45 is disposed for each arm link mechanism 4. For example as shown in FIG. 1, each force sensor 45 is made up of a six-axis force sensor which is interposed between the wrist join mechanism 26 and the hand 23 in an arm link mechanism 4.

The laser distance-measuring sensor 46 and the camera 47 each constitute an external-object recognition sensor which functions as a sensor capable of measuring a distance to each portion of a surface portion of an external object existing in the vicinity of the robot 1.

Specifically, the laser distance-measuring sensor 46 is configured with a laser range finder, for example. In an example of the present embodiment, as shown in FIG. 1, the laser distance-measuring sensor 46 (hereinafter, simply referred to as "distance-measuring sensor 46") is mounted on a movable portion 5a which is arranged at each side on the right and left of the head 5, so as to be swingable within a predetermined angle range about the yaw axis. The distance-measuring sensor 46 in each movable portion 5a outputs laser beams in a plurality of directions within a predetermined range, at a given swing position of the movable portion 5a, thereby enabling measurement of distances to a plurality of measurement points (irradiated with the laser beams) on a surface portion of an external object existing in the vicinity of the robot 1.

The camera 47 is a compound-eye type stereo camera. In an example of the present embodiment, as shown in FIG. 1, the camera 47 is mounted on the head 5, between the right and left movable portions 5a, 5a. The camera 47 enables measurement of a distance to each portion on a surface portion of an external object existing within the imaging range of the camera 47, from images picked up by the camera 47, by a stereo distance measurement technique.

Here, an object the distance to which is to be measured by the distance-measuring sensor 46 and the camera 47 is, more specifically, a surface portion of an external object, such as a contacting object ground (floor, ground, etc.) of the robot 1, a wall, an installed article or the like, which exists in a measuring object area surrounding the robot 1 (i.e. external area within a predetermined range as seen from the robot 1, such as an area in front of the robot 1 in its advancing direction), and with which the robot 1 may come into contact during the operation of the robot 1.

Supplementally, one or both of the distance-measuring sensor 46 and the camera 47 may be mounted on a site (the body 2 etc.) other than the head 5 of the robot 1. Either the distance-measuring sensor 46 or the camera 47 (for example, the camera 47) may be omitted. Further, instead of one or both of the distance-measuring sensor 46 and the camera 47, or in addition to the distance-measuring sensor 46 and the camera 47, a distance-measuring sensor other than the laser distance-measuring sensor may be mounted on the robot 1.

The control device 40 is an electronic circuit unit including a CPU, RAM, ROM, interface circuit, and so on. The control device 40 receives detection signals from the respective sensors 42 to 47 described above. The control device 40 may be made up of a plurality of mutually communicable electronic circuit units.

The control device 40 includes, as functions implemented when installed programs are executed, or as functions implemented by hardware configurations, an environment information generating unit 51 which generates environment information indicating a spatial arrangement state of a surface portion of an external object such as a contacting object ground that exists in the operating environment of the robot 1, and a robot operation control unit 52 which performs operation control of the robot 1 using the environment information.

The environment information generating unit 51 includes: an environment information measuring/creating unit 61 which creates environment information based on measurement data obtained by the distance-measuring sensor 46 and the camera 47, at a predetermined cyclic measurement processing timing, or at a measurement processing timing designated as appropriate from an external server or the like; an environment information integration processing unit 62 which executes processing of accumulatively integrating and storing the environment information created by the environment information measuring/creating unit 61 at each measurement processing timing and an environment information supplementary processing unit 63 which executes supplementary processing, as appropriate, such as correction or addition of the environment information in a specific area of the external object.

It should be noted that the environment information generating unit 51 imparts the function as an embodiment of the operating environment information generating device of the present invention to the control device 40.

Further, the environment information measuring/creating unit 61 and the environment information integration processing unit 62 correspond to the environment information measuring/creating section and the environment information storing section, respectively, of the present invention.

Further, the environment information supplementary processing unit 63 includes the functions as the contact-surface position/posture estimating section, the environment information correcting section, the edge information correcting section, and the corner position estimating section in the present invention.

Specific processing performed by the control device 40 will now be described. First, for convenience of explanation, control processing performed by the robot operation control unit 52 will be described.

In the present embodiment, in the case where a request for movement of the robot 1 is received from an external server or a controlling device (not shown), or in the case where such a movement request is generated in accordance with a preset schedule (movement plan), the robot operation control unit 52 successively generates a desired gait for movement of the robot 1. A desired gait is a desired operation pattern of the robot 1. The desired gait is configured with, for example, a desired motion trajectory of each foot 13, a desired motion trajectory of the body 2, and the like.

Here, the desired motion trajectory of a given site, such as a foot 13, of the robot 1 is specifically configured with time series of desired position and desired posture of the site. It should be noted that the position of a given site of the robot 1 means a position of a representative point of the site, and the posture of a given site of the robot 1 means a spatial posture of the site.

Further, the desired position and desired posture of a given site, such as a foot 13, of the robot 1 are described as a position and posture observed in a global coordinate system (world coordinate system) which is arbitrarily designed and set with respect to the operating environment of the robot 1. In the description of the present embodiment, the X and Y axes in the global coordinate system are regarded as horizontal axes orthogonal to each other, and the Z axis is regarded as a vertical axis.

The robot operation control unit 52 generates a trajectory (time series) of desired displacement amount for each joint of the robot 1 in such a way as to implement the generated desired gait. The robot operation control unit 52 then controls the joint actuator 41 corresponding to each joint in such a manner that the actual displacement amount of each joint of the robot 1, detected by the corresponding joint displacement sensor 43, tracks the trajectory of the desired displacement amount. In this manner, the operation of the robot 1 is controlled in accordance with the desired gait.

Thus, the robot operation control unit 52 performs operation control of the robot 1 while generating a desired gait. In this case, the desired gait of the robot 1 may be generated using a technique similar to any of known techniques.

For example, in the case where it is requested that the robot 1 travels in a biped gait operation, the robot operation control unit 52 successively carries out the following processing: setting, for the respective feet 13, 13 of the right and left leg link mechanisms 3R, 3L, planned landing positions and planned landing postures for a plurality of steps on the basis of the environment information generated in the environment information generating unit 51; generating a desired motion trajectory for each foot 13 in accordance with the planned landing positions and planned landing postures; and generating a desired motion trajectory of the body 2, using a dynamic model of the robot 1, so as to satisfy dynamic constraint conditions related to the position of the zero moment point (ZMP) and the like as well as to allow the robot 1 to make continual motion.

In this manner, the desired gait for causing the robot 1 to travel in the biped gait operation is generated successively. It should be noted that in the desired gait of this case, desired motion trajectories of the respective arm link mechanisms 4 and the head 5 relative to the body 2 may be set arbitrarily.

Further, for example in the case where it is requested that the robot 1 travels in a quadruped gait operation, the robot operation control unit 52 successively carries out the following processing: setting, for the respective feet 13, 13 of the right and left leg link mechanisms 3R, 3L and for the respective hands 23, 23 of the right and left arm link mechanisms 4R, 4L, planned landing positions and planned landing postures for a plurality of steps on the basis of the environment information generated in the environment information generating unit 51; generating a desired motion trajectory for each foot 13 and for each hand 23 in accordance with the planned landing positions and planned landing postures; and generating a desired motion trajectory of the body 2, using a dynamic model of the robot 1, so as to satisfy dynamic constraint conditions related to the position of the ZMP and the like as well as to allow the robot 1 to make continual motion.

In this manner, the desired gait for causing the robot 1 to travel in the quadruped gait operation is generated successively. In the desired gait of this case, a desired motion trajectory of the head 5 relative to the body 2 may be set arbitrarily.

Supplementally, the processing of generating a desired gait as described above is performed successively for example at each operation of one step of the robot 1, or at predetermined control processing cycles. It should be noted that the operation of one step of the robot 1 refers to a series of operation of causing a foot 13 or a hand 23 which is in contact with the ground to move in the air and then to land on the ground.

Further, the desired gait for operation of the robot 1 is not limited to the desired gait for operation in biped gait or quadruped gait as described above. For example, a desired gait for the robot 1 to travel while repeatedly touching a wall with each hand 23 as appropriate may be generated as well.

Next, the processing performed by the environment information generating unit 51 will be described. In the present embodiment, the environment information generated by the environment information generating unit 51 is configured with local environment information which indicates a spatial arrangement state of a surface portion of an external object, such as a contacting object ground existing in the operating environment of the robot 1, in a respective one of a plurality of small-sized local areas AR arranged virtually with respect to the surface portion of the external object. In the present embodiment, each local area AR is a circular area as shown, for example, in FIGS. 3 and 4A. The shape of each local area AR, however, is not limited to a circular shape; it may be, for example, a polygonal shape like a tetragon, hexagon, etc.

Here, each local area AR has a meaning as a candidate for an area with which a foot 13 or a hand 23 is to be brought into contact after movement in the air in the processing of generating a desired gait of the robot 1. That is, in the present embodiment, in the case of generating a desired gait for causing a foot 13 or a hand 23 of the robot 1 to come into contact with a surface portion of an external object after the movement in the air, the robot operation control unit 52 selects one local area AR from among a plurality of local areas AR (candidate areas) as an area with which a foot 13 or a hand 23 is to be brought into contact after the movement in the air. The robot operation control unit 52 then sets a planned contact position and a planned contact posture of the foot 13 or the hand 23 after the movement in the air, within the selected local area AR.

In this case, selection of the local area AR as a planned contact area, and setting of the planned contact position and the planned contact posture of a foot 13 or a hand 23 in the selected local area AR are carried out on the basis of the local environment information in each local area AR.

It should be noted that the "planned contact position" and the "planned contact posture" are more generalized expressions for the "planned landing position" and the "planned landing posture", respectively, in the above-described processing of generating a desired gait for a biped gait operation or for a quadruped gait operation of the robot 1.

In order to generate environment information for the local areas AR, the environment information generating unit 51 carries out the following processing at each measurement processing timing.

At each measurement processing timing, the environment information generating unit 51 first carries out the processing in the environment information measuring/creating unit 61. The processing in the environment information measuring/creating unit 61 at each measurement processing timing is carried out as indicated by the flowchart in FIG. 5.

In STEP 1, the environment information measuring/creating unit 61 measures, by the distance-measuring sensor 46 and the camera 47, distances (from a predetermined reference point of the distance-measuring sensor 46 or the camera 47) to a plurality of measurement points on a surface portion of an external object which exists in a measuring object area surrounding the robot 1.

Figure 3:
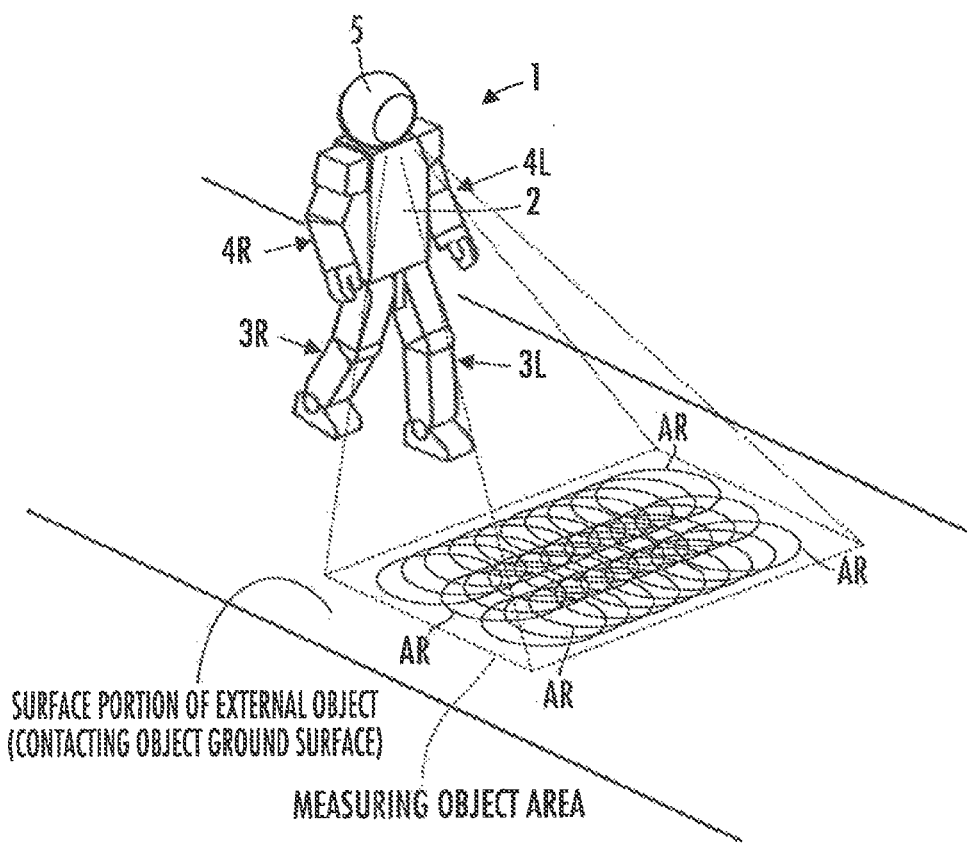
FIG. 3 shows a plurality of local areas which are set in the processing performed by an environment information measuring/creating unit shown in FIG. 2.

Further, in STEP 2, the environment information measuring/creating unit 61 virtually sets new local areas AR so as to be distributed over the surface portion of the external object in the measuring object area, as illustrated in FIG. 3. In FIG. 3, only the local areas AR newly arranged at the current time's (present) measurement processing timing are shown by way of example; the local areas AR previously set up to the last time's measurement processing timing are not illustrated.

Each local area AR that the environment information measuring/creating unit 61 virtually sets on the surface portion of the external object at each measurement processing timing is set to a size (area or diameter) which is predetermined such that a contact surface of a contacting site (foot 13 or hand 23) of the robot 1 to be brought into contact with the external object in the local area AR is entirely (or almost entirely) enclosed in that local area AR (for example, the diameter of the local area AR is set to be slightly greater than the maximum length of the contact surface of the robot 1 in the local area AR).

Further, the local areas AR are arranged such that neighboring local areas AR partially overlap each other when the surface portion of the external object is seen from the front.

It should be noted that the pattern of distribution of the local areas AR arranged on a surface portion of an external object may be a regular distribution pattern such as an array in matrix, or it may be a random distribution pattern.

Further, the local areas virtually set on a surface portion of an external object may be classified into two groups of those for contact with a foot 13 and those for contact with a hand 23, for example, and the local areas for contact with a foot 13 and the local areas for contact with a hand 23 may be set to different sizes.

Next, in STEP 3, the environment information measuring/creating unit 61 creates, for each of the newly set local areas AR, local environment information that indicates the arrangement state of the surface portion of the external object in that local area AR, on the basis of measurement data obtained (in the local area AR) by the distance-measuring sensor 46 and the camera 47. In the following description, the local environment information that the environment information measuring/creating unit 61 creates on the basis of the measurement data by the distance-measuring sensor 46 and the camera 47 may be referred to as "measured local environment information", for distinguishing the same from the local environment information that has undergone correction or the like by the environment information supplementary processing unit 63 which will be described later.

The measured local environment information created by the environment information measuring/creating unit 61 for each local area AR includes a plurality of kinds of information data items which indicate whether there is a proper contact surface for a foot 13 or a hand 23 of the robot 1 (surface with which the foot 13 or the hand 23 can properly come into contact) in the local area AR, or a spatial existence position of the proper contact surface, a spatial posture (orientation) of the proper contact surface, and the like.

A specific example of the measured local environment information created by the environment information measuring/creating unit 61 will now be described, by giving as a representative example the case where local areas AR are set on a surface portion of an external object, such as a floor or ground, constituting a contacting object ground with which a foot 13 or a hand 23 of the robot 1 will come into contact.

In the present embodiment, the measured local environment information that is created by the environment information measuring/creating unit 61 corresponding to each local area AR arranged with respect to a surface portion (hereinafter, referred to as "contacting object ground surface") of a floor or other contacting object ground includes a value of a ground-contacting enable/disable flag that indicates, by ON and OFF, whether or not there is a proper contact surface (specifically, surface that may be considered to be proper to place a foot 13 or a hand 23 of the robot 1 thereon so as to receive reaction force supporting the self-weight of the robot 1 (reaction force against the gravitational force) therefrom) in that local area AR.

In this case, for example in the case where it is recognized from the measurement data (distance-measurement data) by one or both of the distance-measuring sensor 46 and the camera 47 in the local area AR that there is a flat surface whose inclination with respect to the horizontal plane is within a predetermined range and whose area (size) is a predetermined value or larger in the local area AR, the ground-contacting enable/disable flag is set to ON (it is determined that there is a proper contact surface).

In the case where the existence of such a flat surface is not recognized in the local area AR, the ground-contacting enable/disable flag is set to OFF (it is determined that there is no proper contact surface). It should be noted that the flat surface may include, not only a planar flat surface, but also an approximately flat surface with sufficiently small curvature.

Further, in the case where there is a proper contact surface in a local area AR, the local area AR is set to be an area located on a plane that includes the proper contact surface.

Here, in the case where a local area AR is arranged on a relatively wide and flat contacting object ground surface existing in the operating environment of the robot 1, the entire local area AR becomes the proper contact surface.

Figure 4A:
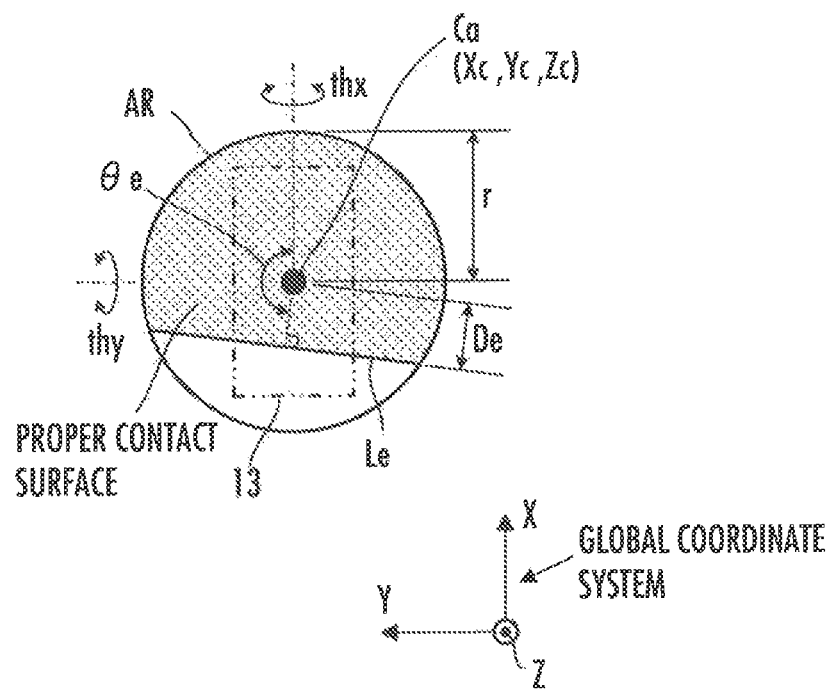
FIGS. 4A and 4B illustrate local environment information which is created for each local area by the environment information measuring/creating unit.
Figure 4B:
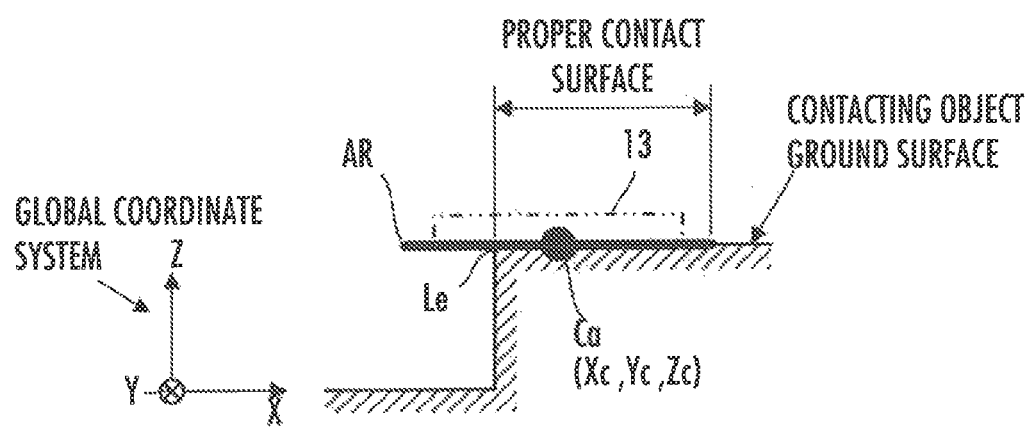

On the other hand, for example in the case where a contacting object ground surface is of a stepped portion (for example, a stepwise floor surface) as shown in FIG. 4B and when a local area AR is arranged on that surface at a position partially going off or protruding from the flat tread as a proper contact surface of the stepped portion, then the proper contact surface in the local area AR becomes an area as indicated by a stipple pattern in FIG. 4A, for example. In this case, the proper contact surface in the local area AR has a boundary line Le which corresponds to an edge of the tread of the stepped portion within the local area AR.

Thus, in the case where there is a proper contact surface in a local area AR, the measured local environment information created for the local area AR further includes, in addition to the above-described ground-contacting enable/disable flag for example the following: a spatial coordinate position (Xc, Yc, Zc) of a central point Ca as a representative point of the local area AR; an inclination angle (thx, thy) representing a spatial posture of the proper contact surface (=spatial posture of the local area AR); a radius r (or diameter) of the local area AR; a distance De from the central point Ca of the local area AR to the boundary line (edge) Le of the proper contact surface within the local area AR; and a tilt angle θe of the boundary line (edge) Le.

In this case, the spatial position of the central point Ca, which becomes a point on a plane including the proper contact surface of the local area AR, corresponds to the arrangement position of the local area AR. The coordinate position (Xc, Yc, Zc) of the central point Ca is a coordinate position observed in the aforesaid global coordinate system.

Further, the inclination angle (thx, thy) representing the spatial posture of the proper contact surface of the local area AR (=spatial posture of the local area AR) is configured with, for example, an inclination angle thx about the X axis and an inclination angle thy about the Y axis of the proper contact surface observed in the global coordinate system.

Further, the tilt angle θe of the boundary line Le of the proper contact surface is expressed as, for example, a tilt angle about the Z axis in the global coordinate system. In the example shown in FIG. 4A, the tilt angle θe is expressed as an angle made by a perpendicular from the central point Ca of the local area AR to the boundary line Le with respect to the X-axis direction of the global coordinate system.

The above-described coordinate position (Xc, Yc, Zc), inclination angle (thx, thy), distance De, and tilt angle θe as the constituent elements of the measured local environment information in each local area AR having a proper contact surface are determined on the basis of measurement data (distance-measurement data) obtained by one or both of the distance-measuring sensor 46 and the camera 47 in the local area AR.

In the case where an entire local area AR corresponds to a proper contact surface, instead of the aforesaid distance De and tilt angle θe, the value of a flag indicating that there is no edge Le, for example, is set as a constituent element of the measured local environment information corresponding to the local area AR. Alternatively, instead of setting the flag value, the distance De or the tilt angle θe may be set to a predetermined value that is distinguishable from when there is an edge Le.

Further, in the case where there is no proper contact surface in a local area AR, data indicating a position of the central point Ca of the local area AR, and data indicating a surface that is at the highest level in the local area AR or a position and posture of an edge therein, for example, are set as the constituent elements of the measured local environment information corresponding to the local area AR, in addition to the aforesaid ground-contacting enable/disable flag.

In the above-described manner, in STEP 3, the environment information measuring/creating unit 61 creates measured local environment information in each of a plurality of local areas AR on the basis of the measurement data by the distance-measuring sensor 46 and the camera 47.

Supplementally, the local environment information for each local area AR is not limited to the above form; another form may be adopted. Further, the value of the ground-contacting enable/disable flag may be set taking into consideration a factor other than the area (size) of the proper contact surface. For example, the ground-contacting enable/disable flag for a local area AR may be set to OFF in the case where an edge Le of a stepped portion is included in the local area AR or in the case where there is an edge Le of a stepped portion within a predetermined distance from the local area AR.

Next, in STEP 4, the environment information measuring/creating unit 61 creates status information indicating the degree of reliability of the measured local environment information in each of the newly created local areas AR. In the present embodiment, the status information (hereinafter, referred to as "reliability status information") is, for example, binary information indicating high and low of the degree of reliability of the measured local environment information for each local area AR.

In this case, the reliability status information about the measured local environment information in a local area AR is set to a value indicating that the degree of reliability is relatively high (hereinafter, referred to as "high reliability") in the case where the distance to the local area AR (specifically, distance from a reference point of the distance-measuring sensor 46 or the camera 47 to the central point Ca of the local area AR) at the time of measurement by the distance-measuring sensor 46 or the camera 47 is a predetermined threshold value or smaller, or in the case where the number of valid measurement points in the local area AR (the number of measurement points at which valid distance-measurement data was obtained in the local area AR) is a predetermined threshold value or greater.

Further, the reliability status information about the measured local environment information in a local area AR is set to a value indicating that the degree of reliability is relatively low (hereinafter, referred to as "low reliability") in the case where the distance from the robot 1 to the local area AR is greater than the predetermined threshold value and the number of valid measurement points in the local area AR is smaller than the predetermined threshold value.

Here, in the present embodiment, the local areas AR for which the reliability status information has been set as "high reliability" (excluding those with the ground-contacting enable/disable flag set to OFF) are areas from which the robot operation control unit 52 may select one, when generating a desired gait for traveling of the robot 1, as a planned landing area of a foot 13 or a hand 23 in an operation of the n-th step (where n is an arbitrary number) of the robot 1.

Further, the local areas AR for which the reliability status information has been set as "low reliability" (excluding those with the ground-contacting enable/disable flag set to OFF) are areas from which the robot operation control unit 52 is prohibited from selecting one as a planned landing area of a foot 13 or a hand 23 in an operation of the first step, when generating a desired gait for traveling of the robot 1, but from which it may select one as a planned landing area of a foot 13 or a hand 23 in an operation of the second step and on.

As such, any local area AR with the reliability status information set as "low reliability" is excluded from candidates for a planned landing area of a foot 13 or a hand 23 in the first step. This ensures that a planned landing area of a foot 13 or a hand 23 on which the foot or the hand is to be landed after movement in the air in the current operating state of the robot 1 is prevented from being selected within a local area AR having the measured local environment information whose degree of reliability is low.

The above has described the processing performed by the environment information measuring/creating unit 61 at each measurement processing timing.

Supplementally, the reliability status information may be set according to another factor instead of one or both of, or in addition to, a distance to a local area AR and the number of valid measurement points in the local area AR. For example, the reliability status information may be set to "low reliability" on the condition that dispersion of the measurements in a local area AR is a predetermined threshold value or greater, and the reliability status information may be set to "high reliability" when the dispersion is smaller than the predetermined threshold value.

Next, the environment information generating unit 51 carries out the processing in the environment information integration processing unit 62. The environment information integration processing unit 62 creates, at each measurement processing timing, integrated environment information data which is a data group made up of local environment information in a large number of local areas AR including: a plurality of local areas AR (which may be hereinafter referred to as "currently set local areas AR") newly set on a surface portion of an external object by the environment information measuring/creating unit 61, and a plurality of local areas AR (which may be hereinafter referred to as "previously set local areas AR") which were set at the past measurement processing timings (up to the last time's measurement processing timing) by the environment information measuring/creating unit 61.

The integrated environment information data may be created basically by accumulatively integrating the local environment information for a plurality of local areas AR set by the environment information measuring/creating unit 61 up to the current measurement processing timing. Simply accumulatively integrating the local environment information created up to the current measurement processing timing, however, will cause an inconvenience that there occurs an area overcrowded with the local areas, or that the data amount of the integrated environment information data becomes too large.

In view of the foregoing, in the processing of the environment information integration processing unit 62 in the present embodiment, the local environment information corresponding to some of the previously set local areas AR that meet a predetermined deletion object condition are deleted.

The processing in the environment information integration processing unit 62 is carried out specifically as shown by the flowchart in FIG. 6.

In STEP 11, the environment information integration processing unit 62 obtains previously created integrated environment information data, which is the integrated environment information data created at the last time's measurement processing timing, and currently created measured local environment information, which is the measured local environment information created corresponding respectively to a plurality of currently set local areas AR. Hereinafter, a combination of the previously created integrated environment information data and the currently created measured local environment information will be referred to as "provisional integrated environment information data".

Supplementally, the previously created integrated environment information data includes local environment information that has undergone correction and the like by the environment information supplementary processing unit 63 which will be described later.

Next, the environment information integration processing unit 62 carries out loop processing from STEP 12 to STEP 17, to perform deletion determination processing of determining, for each local area AR in the provisional integrated environment information data, whether or not the local environment information meets the deletion object condition, and to delete any local area AR and the local environment information thereof that meet the deletion object condition.

In this case, the local area AR and its local environment information to be deleted are determined such that the degree of denseness of the local areas AR included in the integrated environment information data to be newly created will not become unnecessarily high, and that the degree of reliability of the local areas AR included in the integrated environment information data will be kept as high as possible.

Specifically, in STEP 12, the environment information integration processing unit 62 selects, from the provisional integrated environment information data, one local area AR(i) for determining whether it meets a deletion object condition. In this case, the local areas AR in the provisional integrated environment information data are selected in turn. Hereinafter, one local area AR selected in STEP 12 will be referred to as "selected local area AR(i)".

Next, in STEP 13, the environment information integration processing unit 62 sets a proper lower limit dmin (hereinafter, referred to as "neighboring area-to-area proper lower limit distance dmin") for a distance from the currently selected local area AR(i) to another local area AR that is closest therefrom. In the present embodiment, the neighboring area-to-area proper lower limit distance dmin is variably set in accordance with, for example, the geometry of a contacting object ground surface (surface portion of an external object) in the selected local area AR(i) or in an area in the vicinity thereof.

More specifically, in the present embodiment, the neighboring area-to-area proper lower limit distance dmin is set variably in accordance with the positional relationship between the selected local area AR(i) and an edge of a stepped portion on a contacting object ground surface.

That is, as the neighboring area-to-area proper lower limit distance dmin, different predetermined values are set for the following cases: the case where the selected local area AR(i) is an area on an edge (the case where there is an edge in the selected local area AR(i)); the case where the selected local area AR(i) is not on an edge but relatively close to an edge (specifically, the case where the distance from the central point Ca of the selected local area AR(i) to the closest edge is a predetermined threshold value or smaller); and the case where the selected local area AR(i) is not on an edge and distant from an edge (specifically, the case where the distance from the central point Ca of the selected local area AR(i) to the closest edge exceeds the predetermined threshold value).

In this case, when the predetermined values set as the neighboring area-to-area proper lower limit distance dmin for the case where the selected local area AR(i) is on an edge, the case where it is relatively close to an edge, and the case where it is distant from an edge are denoted respectively as dmin1, dmin2, and dmin3, the predetermined values are set in advance to satisfy: dmin1<dmin2<dmin3. In this manner, the neighboring area-to-area proper lower limit distance dmin is set to a smaller distance value as the selected local area AR(i) is closer to an edge.

In the present embodiment, three values are set as the neighboring area-to-area proper lower limit distance, as described above. However, four or more values may be set as the neighboring area-to-area proper lower limit distance in accordance with the positional relationship between the selected local area AR(i) and an edge of a stepped portion.

Next, in STEP 14, the environment information integration processing unit 62 determines whether the provisional integrated environment information data (excluding the data items already deleted) includes any local area AR (hereinafter, referred to as "proximate local area AR(j)") that exists in an area surrounding the selected local area AR(i) at a distance shorter than the above-described neighboring area-to-area proper lower limit distance dmin from the selected local area AR(i).

In this case, the distance between the selected local area AR(i) and another local area AR in its vicinity is calculated as a distance between their central points Ca. It should be noted that the distance between the selected local area AR(i) and another local area AR in its vicinity becomes an index value for the degree of denseness of local areas AR in the vicinity of the selected local area AR(i).

If the determination result in STEP 14 is negative (in the case where there is no proximate local area AR(j)), the environment information integration processing unit 62 determines that the selected local area AR(i) does not meet the deletion object condition, and performs determination processing in STEP 17, which will be described later.

If the determination result in STEP 14 is positive (in the case where there is a proximate local area AR(j)), the environment information integration processing unit 62 next determines, in STEP 15, whether the selected local area AR(i) should be deleted (whether it meets the deletion object condition).

In the present embodiment, the determination in STEP 15 is made on the basis of: time information indicating a temporal relationship between the setting times (times of creation) of the selected local area AR(i) and the proximate local area AR(j); and reliability status information for the selected local area AR(i) and the proximate local area AR(j). These time information and reliability status information become indices indicating the degree of reliability of the local environment information for each local area AR.

Specifically, in the case where the selected local area AR(i) is a currently set local area, the environment information integration processing unit 62 determines that the selected local area AR(i) does not meet the deletion object condition (sets the determination result in STEP 15 as NO), irrespective of the reliability status information.

In the case where the selected local area AR(i) and the proximate local area AR(j) are both previously set local areas and they differ in setting times from each other, the environment information integration processing unit 62 determines that the selected local area AR(i) meets the deletion object condition (sets the determination result in STEP 15 as YES) if a combination of the temporal relationship between the setting times and the reliability status information for the selected local area AR(i) and the proximate local area AR(j) matches one of (1a), (1b), and (1c) in Table 1 or (2a) in Table 2 below.

On the other hand, if the combination of the temporal relationship between the setting times and the reliability status information for the selected local area AR(i) and the proximate local area AR(j) matches (1d) in Table 1 or one of (2b), (2c), and (2d) in Table 2 below, then the environment information integration processing unit 62 determines that the selected local area AR(i) does not meet the deletion object condition (sets the determination result in STEP 15 as NO).

TABLE 1

| | AR(i) and AR(j) are previously set local areas, and AR(i) is older than AR(j): | | |
|---|---|---|---|
| | Reliability status information for selected local area AR(i) | Reliability status information for proximate local area AR(j) | Is AR(i) a deletion object? |
| (1a) | low reliability | high reliability | YES |
| (1b) | low reliability | low reliability | YES |
| (1c) | high reliability | high reliability | YES |
| (1d) | high reliability | low reliability | NO |

TABLE 2

| | AR(i) and AR(j) are previously set local areas, and AR(i) is newer than AR(j): | | |
|---|---|---|---|
| | Reliability status information for selected local area AR(i) | Reliability status information for proximate local area AR(j) | Is AR(i) a deletion object? |
| (2a) | low reliability | high reliability | YES |
| (2b) | low reliability | low reliability | NO |
| (2c) | high reliability | high reliability | NO |
| (2d) | high reliability | low reliability | NO |

As such, in the present embodiment, in the case where the selected local area AR(i) and the proximate local area AR(j) are both previously set local areas and the setting times of the selected local area AR(i) and the proximate local area AR(j) differ from each other, it is determined that the selected local area AR(i) is to be deleted if the degree of reliability indicated by the reliability status information for the selected local area AR(i) is lower than that for the proximate local area AR(j), or if the setting time of the selected local area AR(i) is older than that of the proximate local area AR(j) when the selected local area AR(i) and the proximate local area AR(j) are the same in degree of reliability indicated by the reliability status information.

It should be noted that in the case where the selected local area AR(i) and the proximate local area AR( ) are both previously set local areas and the setting times of the selected local area AR(i) and the proximate local area AR(j) are the same with each other, the environment information integration processing unit 62 evaluates the degree of reliability of each of the selected local area AR(i) and the proximate local area AR(j) on the basis of a value of a predetermined evaluation function calculated in accordance with the distance to the local area AR at the time of measurement by the distance-measuring sensor 46 or the camera 47 and the number of valid measurement points in the local area AR, for example. The environment information integration processing unit 62 then determines whether the selected local area AR(i) is to be deleted or not, on the basis of the evaluation results.

Further, in the case where the selected local area AR(i) is a previously set local area and the proximate local area AR(j) is a currently set local area, the environment information integration processing unit 62 determines that the selected local area AR(i) meets the deletion object condition (sets the determination result in STEP 15 as YES) if the combination of the reliability status information for the selected local area AR(i) and that for the proximate local area AR(j) matches (3a), (3b), or (3c) in Table 3 below.

On the other hand, if the combination of the reliability status information matches (3d) in Table 3 below, the environment information integration processing unit 62 determines that the selected local area AR(i) does not meet the deletion object condition (sets the determination result in STEP 15 as NO).

TABLE 3

AR(i) is a previously set local area, and AR(j) is a currently set local area:

| | Reliability status information for selected local area AR(i) | Reliability status information for proximate local area AR(j) | Is AR(i) a deletion object? |
|---|---|---|---|
| (3a) | low reliability | high reliability | YES |
| (3b) | low reliability | low reliability | YES |
| (3c) | high reliability | high reliability | YES |
| (3d) | high reliability | low reliability | NO |

In this manner, in the present embodiment, when the selected local area AR(i) is a previously set local area and the proximate local area AR(j) is a currently set local area, it is determined that the selected local area AR(i) is to be deleted in the case where the degree of reliability indicated by the reliability status information for the selected local area AR(i) is the same as that for the proximate local area AR(j), or in the case where the degree of reliability of the selected local area AR(i) is lower than that of the proximate local area AR(j).

It should be noted that in the case where the degree of reliability indicated by the reliability status information for the selected local area AR(i) is the same as that for the proximate local area AR(j), taking into account the changes over time of the arrangement state of the surface portion of the external object, it is considered that the local environment information in the selected local area AR(i) the setting time of which is older than that of the proximate local area AR(j) is lower in degree of reliability than the local environment information in the proximate local area AR(j). Therefore, the selected local area AR(i) that was set earlier than the proximate local area AR(j) is determined to be deleted in the case of (1b) or (1c) in Table 1 or in the case of (3b) or (3c) in Table 3.

If the determination result in STEP 15 is negative, the environment information integration processing unit 62 next performs determination processing in STEP 17. If the determination result in STEP 15 is positive, in STEP 16, the environment information integration processing unit 62 deletes the selected local area AR(i) and its corresponding local environment information from the provisional integrated environment information data, before it performs the determination processing in STEP 17.

In STEP 17, the environment information integration processing unit 62 determines whether the deletion determination processing has been performed on all the local areas included in the provisional integrated environment information data. If the determination result in STEP 17 is negative, the environment information integration processing unit 62 repeats the processing from STEP 12.

If the determination result in STEP 17 is positive, in STEP 18, the environment information integration processing unit 62 stores the data obtained by deleting any local area to be deleted and its corresponding local environment information from the provisional integrated environment information data, as integrated environment information data, into a storage medium (not shown). The processing in the environment information integration processing unit 62 is thus completed. It should be noted that the integrated environment information data may be transferred from the robot 1 to an external server or the like for storage therein.

The above has described the processing in the environment information integration processing unit 62 at each measurement processing timing. This processing makes it possible to store, as the integrated environment information data, local environment information corresponding respectively to a large number of local areas over a wide area of the operating environment of the robot 1, while preventing the degree of denseness of the local areas AR from becoming excessively high.

Further, the neighboring area-to-area proper lower limit distance dmin is variably set as described above, so the degree of denseness of the local areas AR becomes higher on an edge or in its vicinity. This facilitates selection of an optimal local area AR at the time of selecting a planned landing area for a foot 13 or a hand 23 on an edge or in its vicinity during the processing of generating a desired gait by the robot operation control unit 52.

Supplementally, in the above-described processing in the environment information integration processing unit 62 of the present embodiment, the currently set local area AR is not determined to be deleted. Therefore, for the purpose of reducing the calculation load, the above-described deletion determination processing may be performed only on the previously set local areas AR.

Further, in the present embodiment, the neighboring area-to-area proper lower limit distance dmin was variably set in accordance with the positional relationship between the selected local area AR(i) and an edge. The neighboring area-to-area proper lower limit distance dmin, however, may be set to a fixed value.

Alternatively, the neighboring area-to-area proper lower limit distance dmin may be set in consideration of the geometry other than an edge (for example, curvature etc.) of the contacting object ground surface.

Next, the environment information generating unit 51 carries out the processing in the environment information supplementary processing unit 63.

At each measurement processing timing, the environment information supplementary processing unit 63 performs supplementary processing, such as adding or correcting local environment information in a specific area, on the integrated environment information data created as described above by the environment information integration processing unit 62. The environment information supplementary processing unit 63 also performs sorting of the local environment information for use in the processing of generating a desired gait for the robot 1. Such processing in the environment information supplementary processing unit 63 is carried out as shown by the flowchart in FIG. 7.

In STEP 21, the environment information supplementary processing unit 63 extracts local areas AR on edges from the integrated environment information data.

Next, in STEP 22, the environment information supplementary processing unit 63 performs on-edge local area interpolation processing of interpolating to add a local area ARp between two local areas AR and AR adjacent to each other on an edge determined to be a same edge. The interpolation processing is performed as appropriate in accordance with the distance between the local areas AR and AR.

In this on-edge local area interpolation processing, the environment information supplementary processing unit 63 calculates a distance d between the two local areas AR and AR (distance between the central points Ca of the respective local areas AR, AR) which are adjacent to each other on a same edge (that extends continuously in an approximately constant direction).

Then, in the case where the calculated value of the distance d between the local areas AR and AR adjacent to each other on the same edge is greater than a predetermined lower limit distance dth, the environment information supplementary processing unit 63 interpolates a local area ARp at a position (central position) between the two local areas AR and AR.

Figure 8:
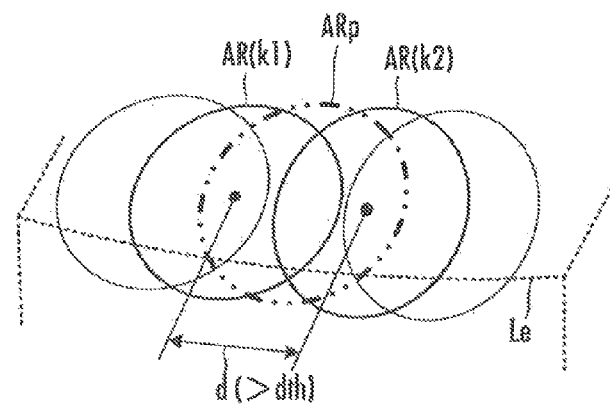
FIG. 8 is an illustration concerning the processing in STEP 22 in FIG. 7.

For example, in the example shown in FIG. 8, the distance d between two local areas AR(k1) and AR(k2) adjacent to each other on a same edge Le is greater than a predetermined lower limit distance dth. In this case, a local area ARp is interpolated at a central position between the two local areas AR(k1) and AR(k2).

It should be noted that the lower limit distance dth is set, for example, to a value equal to or slightly greater than the aforesaid neighboring area-to-area proper lower limit distance dmin (=dmin1) that is set in the case where the selected local area AR(i) is an area on an edge in the processing in the environment information integration processing unit 62.

Hereinafter, the local area ARp interpolated on an edge in the above-described manner will be referred to as "interpolated on-edge local area ARp".

The environment information supplementary processing unit 63 further sets local environment information corresponding to the interpolated on-edge local area ARp thus added.

The local environment information for the interpolated on-edge local area ARp is set in accordance with the local environment information for the two local areas AR and AR on its both sides. For example, in the case where the ground-contacting enable/disable flags for the local areas AR, AR on both sides of the interpolated on-edge local area ARp are both ON, then the ground-contacting enable/disable flag for the interpolated on-edge local area ARp is set to ON.

Further, the values of the parameters for the interpolated on-edge local area ARp, including the coordinate values (Xc, Yc, Zc) of its central point Ca, the inclination angle (thx, thy), and the distance De and the tilt angle θe related to the edge, are each set to an average value of the corresponding parameter values in the local areas AR and AR on both sides thereof.

In the case where the ground-contacting enable/disable flag is OFF in one or both of the two local areas AR and AR on both sides of the interpolated on-edge local area ARp, the ground-contacting enable/disable flag in the interpolated on-edge local area ARp is set to OFF.

Further, for the interpolated on-edge local area ARp, a flag value indicating that the local area ARp is an interpolated on-edge local area is set.

The on-edge local area interpolation processing in STEP 22 is carried out in the above-described manner.

Supplementally, the interpolated on-edge local area ARp and the local environment information corresponding thereto, which are set as appropriate at each measurement processing timing by the environment information supplementary processing unit 63, are not used as elements of the previously created integrated environment information data in the processing in the environment information integration processing unit 62 at a next time's measurement processing timing.

Next, in STEP 23, the environment information supplementary processing unit 63 carries out corner local area setting processing of additionally setting a local area ARc at an estimated position of a corner of the surface portion of an external object (contacting object ground surface) and local environment information corresponding thereto. It should be noted that this corner local area setting processing implements the corner position estimating section in the present invention.

Figure 9:
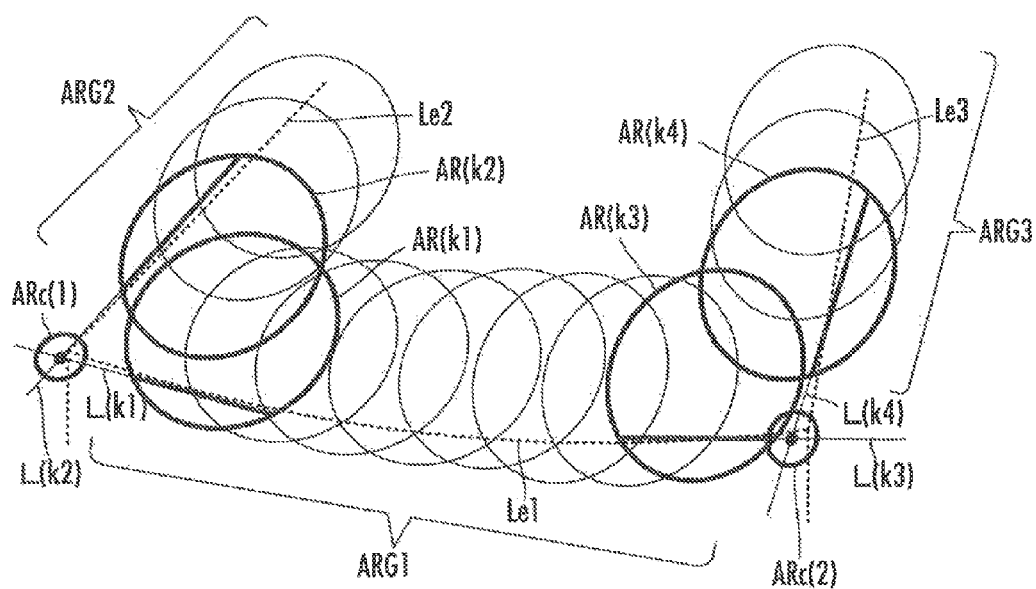
FIG. 9 is an illustration concerning the processing in STEP 23 in FIG. 7.

In the corner local area setting processing, the environment information supplementary processing unit 63 groups the local areas on edges depending on the edges that extend in different directions from each other. For example, as illustrated in FIG. 9, assume that the surface portion of an external object (contacting object ground surface) has a plurality of (in the illustrated example, three) edges Le1, Le2, and Le3 extending in directions different from one another by a predetermined amount or greater on an area that may be regarded as an approximately single flat plane, and that a plurality of local areas AR are set on a respective one of the edges Le1, Le2, and Le3. In this case, the local areas AR on the edges Le1, Le2, and Le3 are classified into groups ARG1, ARG2, and ARG3 corresponding respectively to the edges Le1, Le2, and Le3.

In this case, the classification is performed, on the basis of the inclination angle (thx, thy) of the proper contact surface and the tilt angle θe of the edge in each local area AR, for example, such that the edge extending directions defined by the local environment information for the local areas in one group become almost the same in that group. That is, the local areas AR having the inclination angle (thx, thy) of the proper contact surface and the tilt angle θe of the edge identical or similar to one another are grouped together as being on the same edge.

Further, for each group of local areas corresponding to a same edge, the environment information supplementary processing unit 63 extends an edge in a local area located at an end among the local areas in that group, obtains the position of intersection of the extended lines corresponding respectively to the different edges, and estimates the obtained position of intersection as an approximate existence position of a corner. The environment information supplementary processing unit 63 then sets, on the estimated position, a local area ARc (hereinafter, referred to as "corner local area ARc") as an area in which a corner exists.

For example, in the example shown in FIG. 9, on the surface portion of an external object (contacting object ground surface), corners are formed by a set of the edges Le1 and Le2 and a set of the edges Le1 and Le3. In the case of this example, of the local areas AR in the group ARG1 corresponding to the edge Le1, the edge defined by the local environment information for a local area AR(k1) at an end closer to the edge Le2 side is extended to obtain an extended line L(k1), and, of the local areas AR in the group ARG2 corresponding to the edge Le2, the edge defined by the local environment information for a local area AR(k2) at an end closer to the edge Le1 side is extended to obtain an extended line L(k2). Then, at the position of intersection of the extended lines L(k1) and L(k2), a corner local area ARc(1) is set as the existence area of the corner formed by the set of the edges Le1 and Le2.

Further, of the local areas AR in the group ARG1 corresponding to the edge Le1, the edge defined by the local environment information for a local area AR(k3) at an end closer to the edge Le3 side is extended to obtain an extended line L(k3), and, of the local areas AR in the group ARG3 corresponding to the edge Le3, the edge defined by the local environment information for a local area AR(k4) at an end closer to the edge Le1 side is extended to obtain an extended line L(k4). Then, at the position of intersection of the extended lines L(k3) and L(k4), a corner local area ARc(2) is set as the existence area of the corner formed by the set of the edges Le1 and Le3.

In this case, in the example shown in FIG. 9, each corner local area ARc (ARc(1), ARc(2)) is set as a local area having a smaller area (size) than a normal local area AR (set by the environment information measuring/creating unit 61), although the corner local area ARc may have the same area (size) as the normal local area, for example.

Further, as the local environment information for each corner local area ARc, the environment information supplementary processing unit 63 sets the ground-contacting enable/disable flag to OFF, and sets the coordinate values of the above-described position of intersection defining the position of the corner local area ARc, as the coordinate position (Xc, Yc, Zc) of the central point Ca of that corner local area ARc.

In this manner, the corner local area ARc is set as an area where landing of a foot 13 or a hand 23 of the robot 1 is prohibited.

The corner local area setting processing in STEP 23 is carried out in the above-described manner.

Setting the corner local area(s) ARc in this manner makes it possible to ensure that, in the desired gait generating processing by the robot operation control unit 52, no desired gait will be generated that would cause a foot 13 or a hand 23 of the robot 1 to land on a corner or its vicinity.

Supplementally, the corner local area ARc and the local environment information corresponding thereto, which the environment information supplementary processing unit 63 sets as appropriate at each measurement processing timing, are not used as the elements of the previously created integrated environment information data in the processing performed by the environment information integration processing unit 62 at a next time's measurement processing timing.

Next, in STEP 24, the environment information supplementary processing unit 63 sorts the data of sets of local area AR and local environment information in the integrated environment information data, including the interpolated on-edge local area(s) ARp and the corner local area(s) ARc, in accordance with the distance from the current position of the robot 1 to the respective local areas AR. In this case, the data of sets of local area AR and local environment information are sorted, for example, in ascending order of distance from the robot 1.

Next, in STEP 25, the environment information supplementary processing unit 63 registers, from among the data of sets of local area AR and local environment information, the data of a predetermined number of sets from the one closest to the robot 1, as environment information for use in generating a desired gait for the robot 1. The robot operation control unit 52 uses the environment information thus registered, to generate a desired gait for the robot 1.

Next, in STEP 26, the environment information supplementary processing unit 63 carries out filtering processing for the positions of edges in the local areas on edges included in the environment information for use in generating a desired gait. This completes the processing of the environment information supplementary processing unit 63 at each measurement processing timing. It should be noted that the filtering processing in STEP 26 implements the edge information correcting section in the present invention.

The filtering processing in STEP 26 is processing for reducing the chances that edge positions indicated by the local environment information corresponding respectively to a plurality of local areas AR on a same edge extending in an approximately constant direction would vary between the mutually adjacent local areas AR due to measurement errors or the like.

The filtering processing is performed, for example, in the following manner. The local environment information about the edge position in a certain one of the local areas AR (including the interpolated on-edge local areas ARp) belonging to a group (for example, group ARG1 shown in FIG. 9) of local areas AR arranged on a same edge is corrected in accordance with the local environment information about that edge in a respective one of the other local areas AR in the vicinity of that local area AR. In the present embodiment, the local areas AR located at both ends among the local areas AR on the same edge are excluded from the objects for the filtering processing.

An example of the filtering processing will be described with reference to FIG. 10. In this example, as shown in FIG. 10, of a plurality of local areas arranged on a same edge, the edge position in a given local area AR(k1) is corrected in accordance with the edge position and direction in a respective one of two local areas AR(k2) and AR(k3) on both sides thereof as the other local areas AR in the vicinity of the local area AR(k1).

Figure 10:
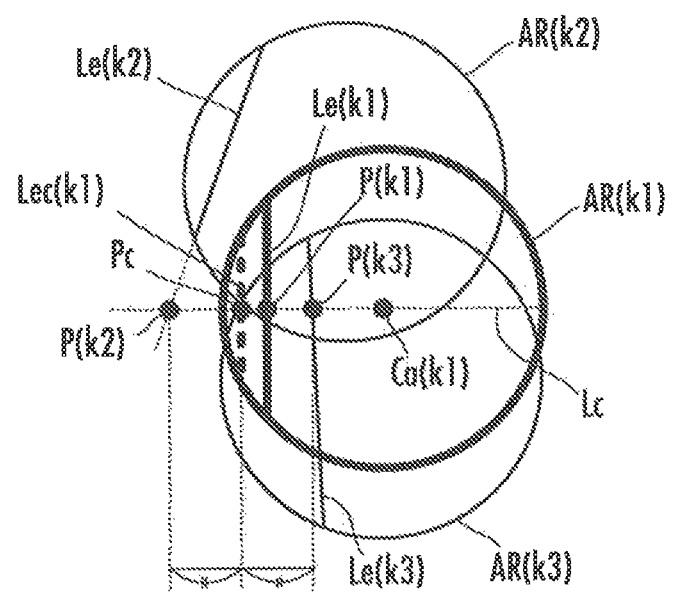
FIG. 10 is an illustration concerning the processing in STEP 26 in FIG. 7.

In the example shown in FIG. 10, edges (before filtering processing) that are defined by the original local environment information for the respective local areas AR(k1), AR(k2), and AR(k3) are indicated by Le(k1), Le(k2), and Le(k3), respectively, in the figure.

In the filtering processing of this example, the environment information supplementary processing unit 63 calculates a position of the point of intersection P(k1) between the original edge Le(k1) in the local area AR(k1) and a line Lc orthogonal to the edge Le(k1) and passing through the central point Ca(k1) of the local area AR(k1) (in other words, it calculates a position of the midpoint of the edge Le(k1) in the local area AR(k1)).

Further, the environment information supplementary processing unit 63 calculates positions of the points of intersection P(k2) and P(k3) (as seen in the normal direction of the local area AR(k1)) between the above-described line Lc and the respective edges Le(k2) and Le(k3) (original edges before filtering processing), or their extended lines, in the other local areas AR(k2) and AR(k3) in the vicinity of (or on both sides of) the local area AR(k1).

Next, the environment information supplementary processing unit 63 calculates a position (on the same plane as the local area AR(k1)) of the midpoint Pc between two points, among the points of intersection P(k1), P(k2), and P(k3), that are located at both ends on the line Lc (in the example shown in FIG. 10, the points of intersection P(k2) and P(k3)).

The environment information supplementary processing unit 63 then sets an edge Lec(k1) (indicated by the broken line in FIG. 10) which is in parallel with the original edge Le(k1) and passes through the midpoint Pc, as a corrected edge (after the filtering processing) in the local area AR(k1), and corrects the local environment information about the edge in the local area AR(k1) to local environment information corresponding to the edge Lec(k1).

In this case, in the present embodiment, of the aforesaid distance De and tilt angle θe constituting the local environment information about the edge in the local area AR(k1), the distance De (from the central point Ca(k1)) is corrected to a value corresponding to the corrected edge Lec(k1).

Therefore, of the local environment information about the position and direction of the edge in the local area AR(k1), the local environment information about the position alone is corrected from the original information.

In the above example of the filtering processing, as described above, of a plurality of local areas arranged on a same edge, the local environment information about the edge position in each local area AR(k1) is corrected in accordance with the local environment information about the original edge (before filtering processing) in a respective one of two local areas AR(k2) and AR(k3) on both sides thereof as the other local areas AR in the vicinity of the local area AR(k1).

This can reduce the variation in edge position in each local area AR among the mutually adjacent local areas arranged on the same edge. As a result, in the desired gait generating processing by the robot operation control unit 52, in the case where a planned landing position and a planned landing posture of a foot 13 or a hand 23 are to be set in a local area AR on an edge or in its vicinity, they can be set appropriately.

In the above filtering processing in the present embodiment, a local area AR at each end among the local areas AR arranged on a same edge is excluded from the objects for the filtering processing as described above, because there is no other local area AR on the same edge on one end of that local area AR. Accordingly, the local environment information about the edge in each of the local areas AR at the respective ends remains unchanged from the local environment information corresponding to the original edge.

Supplementally, the filtering processing described with reference to FIG. 10 is merely an example; filtering processing of another form may be adopted as well. For example, for correcting the local environment information about an edge in a given one of the local areas AR on a same edge, the local environment information about the edge in a respective one of, not only the two local areas AR on its both sides, but also a plurality of local areas within a predetermined distance from the local area AR as an object of correction may be used.

Further, the position of an edge in a given local area AR may be corrected, for example, through filtering processing of averaging the edge positions in the local area AR and in the other local areas AR in its vicinity which are arranged on the same edge.

Furthermore, in addition to or in place of the filtering processing for the position of an edge in each local area AR, filtering processing for the direction of the edge may be performed as well. As such, various forms of processing may be adopted as the filtering processing in STEP 26.

A further description will be made below about interrupt processing performed by the environment information supplementary processing unit 63 in the environment information generating unit 51 during the operation of the robot 1 as well as processing in the robot operation control unit 52 in relation to the interrupt processing.

Figure 11:
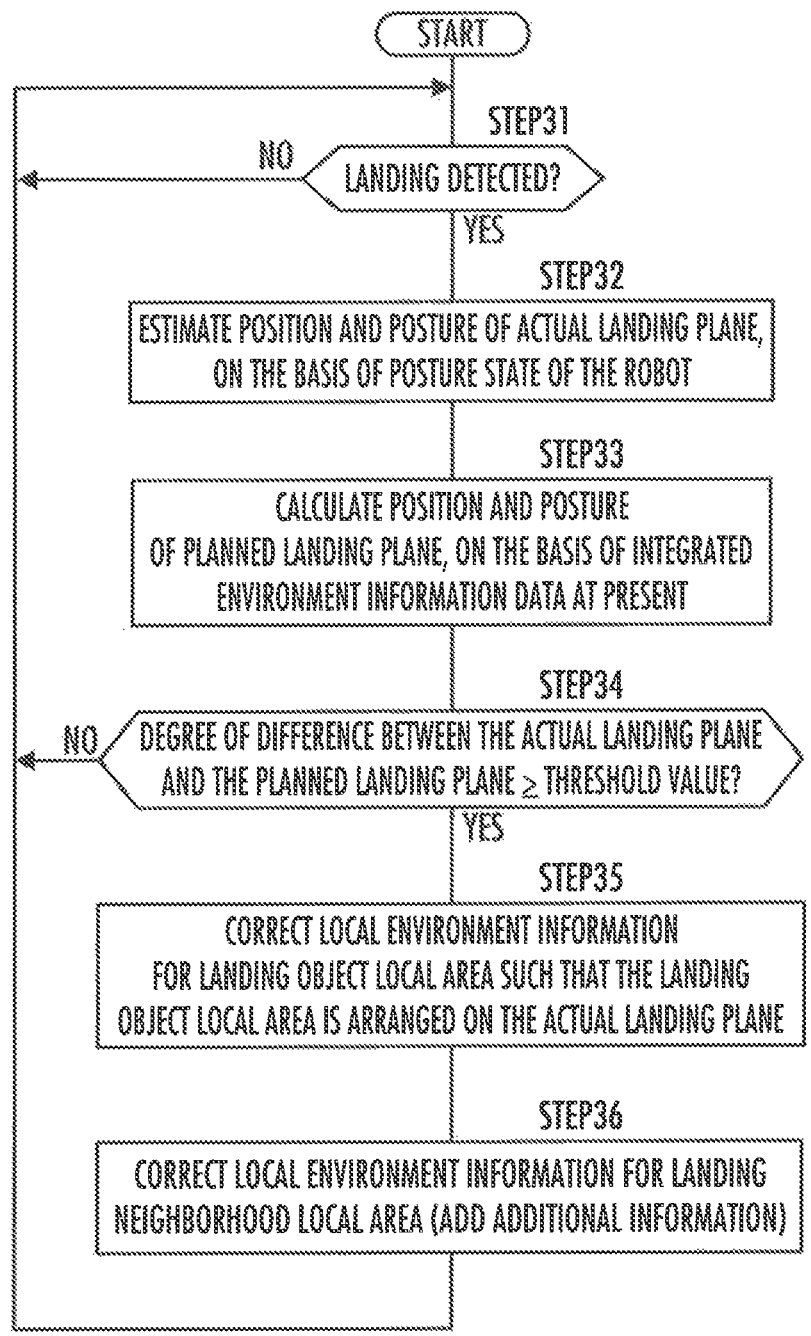
FIG. 11 is a flowchart illustrating the processing performed by the environment information supplementary processing unit shown in FIG. 2.

In the present embodiment, the environment information supplementary processing unit 63 corrects the local environment information as appropriate by further carrying out the interrupt processing as shown by the flowchart in FIG. 11 (processing in STEP 32 and on in FIG. 11) during the operation of the robot 1. The robot operation control unit 52 then performs operation control of the robot 1 reflecting the correction.

Such processing will be described below. In the following description, a foot 13 or a hand 23 which moves in the air during a traveling operation of the robot 1 will be referred to as a moving-side foot 13 or a moving-side hand 23, and a foot 13 or a hand 23 which is kept in contact with the surface portion (contacting object ground surface) of a contacting object ground as an external object while the moving-side foot 13 or the moving-side hand 23 is moving in the air will be referred to as a supporting-side foot 13 or a supporting-side hand 23.

In STEP 31, the environment information supplementary processing unit 63 detects, while the operation control of the robot 1 according to a desired gait is being performed by the robot operation control unit 52, whether a moving-side foot 13 or a moving-side hand 23 which is supposed to land in accordance with the desired gait has actually landed. This detection may be performed on the basis of an output from the aforesaid force sensor 44 or 45, for example.

Each time actual landing of a moving-side foot 13 or a moving-side hand 23 is detected (each time the determination result in STEP 31 becomes positive), the environment information supplementary processing unit 63 carries out the interrupt processing which starts at STEP 32.

In STEP 32, the environment information supplementary processing unit 63 estimates a position and posture of a plane (hereinafter, referred to as "actual landing plane") including the contacting object ground surface at the landing spot of the moving-side foot 13 or the moving-side hand 23, on the basis of the posture state of the robot 1 (specifically, instantaneous posture state that is defined in accordance with the instantaneous value of the displacement amount of each joint of the robot 1 and the instantaneous value of the posture of the body 2) at the time of landing.

More specifically, at the time of landing of the moving-side foot 13 or the moving-side hand 23, the environment information supplementary processing unit 63 obtains a detection value (indicated by an output from the aforesaid joint displacement sensor 43) of the amount of displacement of each joint between the moving-side foot 13 or the moving-side hand 23 and the supporting-side foot 13 or the supporting-side hand 23, and also obtains a detection value (indicated by an output from the aforesaid posture sensor 42) of the spatial posture of the body 2.

The environment information supplementary processing unit 63 then uses the detection values of the displacement amounts of the respective joints and the detection value of the posture of the body 2 to carry out computation of a geometric model (kinematic model) of the robot 1, to thereby calculate estimates of position and posture of the actual landing plane of the moving-side foot 13 or the moving-side hand 23 (specifically, estimates of position and posture observed from a representative point on the ground-contacting surface of the supporting-side foot 13 or the supporting-side hand 23).

In this case, the estimate of the position of the actual landing plane of the moving-side foot 13 or the moving-side hand 23 may be expressed by, for example, a distance between the actual landing plane and the representative point on the ground-contacting surface of the supporting-side foot 13 or the supporting-side hand 23. Further, the estimate of the posture of the actual landing plane of the moving-side foot 13 or the moving-side hand 23 may be expressed as a posture of the actual landing plane observed in the global coordinate system.

In the processing of estimating the position and posture of the actual landing plane of the moving-side foot 13 or the moving-side hand 23, it is desirable to estimate an amount of elastic deformation of the supporting-side foot 13 or the supporting-side hand 23 and an amount of elastic deformation at the time of landing of the moving-side foot 13 or the moving-side hand 23, and to estimate the position and posture of the actual landing plane of the moving-side foot 13 or the moving-side hand 23 in consideration of those elastic deformation amounts. This can improve the estimation accuracy of the position and posture of the actual landing plane.

In this case, the elastic deformation amount may be estimated, for example, from the detection value of the force indicated by an output from the force sensor 44 or 45, by using an appropriate elastic deformation model.

Supplementally, the processing in STEP 32 implements the contact-surface position/posture estimating section in the present invention. In this case, the estimates of the position and posture of the actual landing plane correspond to the estimated contact-surface position/posture in the present invention.

Further, in STEP 33, the environment information supplementary processing unit 63 obtains, from the integrated environment information data at the present time, local environment information for a local area AR (hereinafter, referred to as "supporting side local area ARs") corresponding to the ground-contact location of the supporting-side foot 13 or the supporting-side hand 23 and local environment information for a local area AR (hereinafter, referred to as "landing object local area ARa") corresponding to the planned landing position of the moving-side foot 13 or the moving-side hand 23, and, on the basis of the obtained local environment information, calculates a position and posture of a plane (hereinafter, referred to as "planned landing plane") including the landing object local area ARa, observed from a representative point on the ground-contacting surface of the supporting-side foot 13 or the supporting-side hand 23 in the supporting side local area ARs.

It should be noted that the position and posture of the planned landing plane correspond to the position/posture before contact in the present invention.

Next, in STEP 34, the environment information supplementary processing unit 63 determines whether the degree of difference between the actual landing plane and the planned landing plane is a predetermined threshold value or greater. In this case, more specifically, the degree of difference comprises a deviation in position between the actual landing plane and the planned landing plane and a deviation in posture between the actual landing plane and the planned landing plane. In the determination processing in STEP 34, the deviation in position and the deviation in posture are compared with corresponding threshold values set in advance, to determine whether one of the deviations is equal to or greater than the threshold value.

Here, in the case where the state of the contacting object ground surface in the landing object local area ARa remains unchanged from the state at the time of measurement by the distance-measuring sensor 46 or the camera 47, the actual landing plane and the planned landing plane agree or almost agree with each other.

On the other hand, in the case where the contacting object ground surface is a rough or irregular ground, geographic features may collapse at the time of landing of a moving-side foot 13 or a moving-side hand 23. Such collapsing of the geographic features and other factors may cause discrepancy between the actual landing plane in the landing object local area ARa and the planned landing plane based on the integrated environment information data. In such a case, the determination result in STEP 34 becomes positive.

If the determination result in STEP 34 is negative, the environment information supplementary processing unit 63 returns to an interrupt waiting state until landing of a moving-side foot 13 or a moving-side hand 23 is detected again in STEP 31.

On the other hand, if the determination result in STEP 34 is positive, in STEP 35, the environment information supplementary processing unit 63 corrects the local environment information in the landing object local area ARa, among the integrated environment information data, in such a way as to make the landing object local area ARa become a local area on the actual landing plane.

Here, on the contacting object ground surface at the landing spot of a moving-side foot 13 or a moving-side hand 23, the moving-side foot 13 or the moving-side hand 23 has been placed, making it difficult to measure the state of the contacting object ground surface using the distance-measuring sensor 46 or the camera 47 mounted on the robot 1.

Thus, in STEP 35, the estimates of the position and posture of the actual landing plane calculated in STEP 32 are used to correct the local environment information in the landing object local area ARa.

Figure 12:
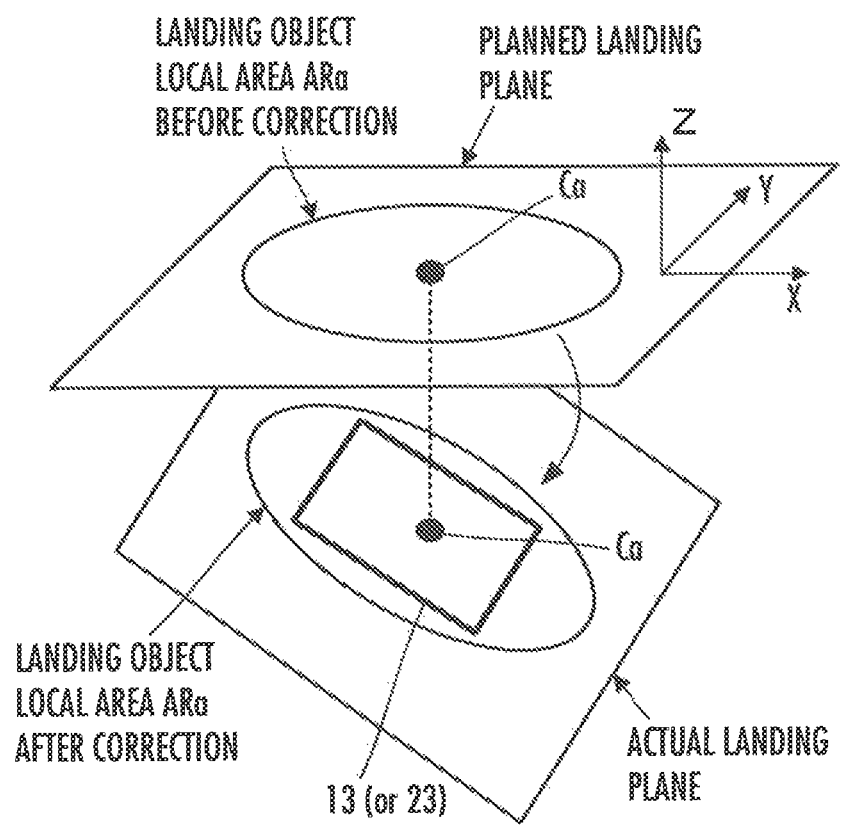
FIG. 12 is an illustration concerning the processing in STEP 35 in FIG. 11.

Specifically, as illustrated in FIG. 12, local environment information about the posture of the landing object local area ARa (specifically, the aforesaid inclination angle (thx, thy)) and local environment information about the height of the landing object local area ARa (specifically, coordinate position Zc in the Z-axis direction of the central point Ca of the landing object local area ARa) are corrected in such a manner that the posture of the landing object local area ARa (=posture of the proper contact surface in the landing object local area ARa) becomes identical to the posture of the actual landing plane estimated together with its position in STEP 32 and that the central point Ca of the landing object local area ARa becomes a point on the actual landing plane.

In this case, the local environment information about the position in the horizontal direction of the landing object local area ARa (coordinate position Xc in the X-axis direction and coordinate position Yc in the Y-axis direction of the central point Ca), the local environment information about the position and direction of the edge in the landing object local area ARa (the aforesaid distance De and tilt angle θe), and the ground-contacting enable/disable flag remain unchanged.

As such, in the situation where the determination result in STEP 34 becomes positive, the local environment information for the landing object local area ARa is corrected on the basis of the estimates of the position and posture of the actual landing plane calculated in STEP 32. Accordingly, the local environment information in a landing object local area ARa which is difficult to measure using the distance-measuring sensor 46 or the camera 47 can be corrected to conform to the actual state of the contacting object ground surface in that landing object local area ARa.

Supplementally, the processing in STEP 35 implements the environment information correcting section in the present invention.

Figure 13:
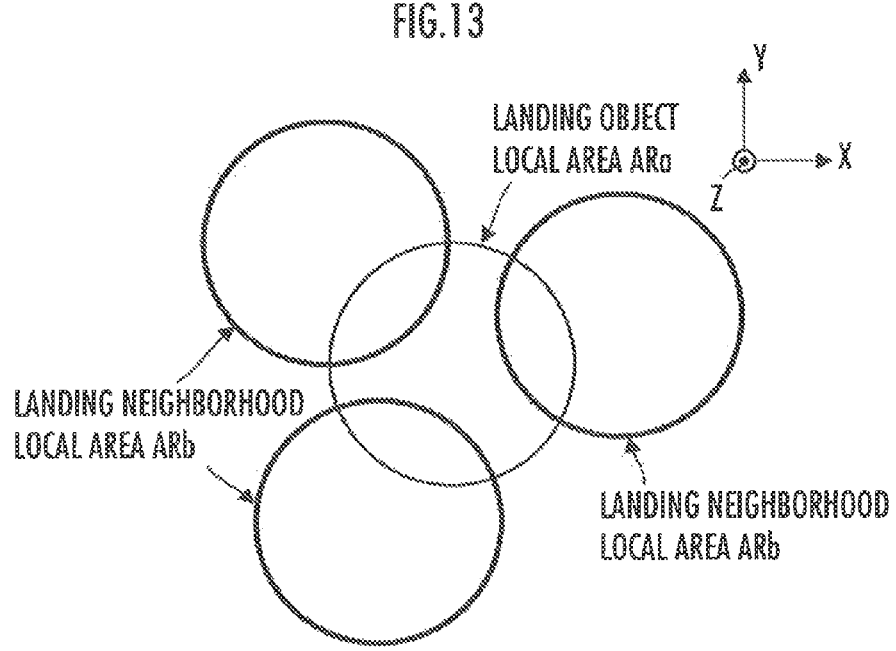
FIG. 13 is an illustration concerning the processing in STEP 36 in FIG. 11.

Next, in STEP 36, the environment information supplementary processing unit 63 adds additional information to the local environment information in a local area AR (hereinafter, referred to as "landing neighborhood local area ARb") in the vicinity of the landing object local area ARa. The landing neighborhood local area ARb is, more specifically, as illustrated in FIG. 13, any local area that partially overlaps the landing object local area ARa as seen in the Z-axis direction (perpendicular to the paper plane of FIG. 13) in the global coordinate system.

The additional information that is added to the local environment information for each landing neighborhood local area ARb in the processing in STEP 36 includes: local environment information about the landing neighborhood local area ARb after movement, which is obtained by assuming that the landing neighborhood local area ARb is moved from the arrangement state defined by the original integrated environment information data (before addition of the additional information) onto the actual landing plane similarly as with the landing object local area ARa, and a value of a flag (referred to as "landing operation restricted mode flag") indicating, by ON or OFF, whether or not the operation of a moving-side foot 13 or a moving-side hand 23 should be made in a landing operation restricted mode when causing the moving-side foot 13 or the moving-side hand 23 to land on the landing neighborhood local area ARb. The value of the landing operation restricted mode flag is set to ON.

Figure 14:
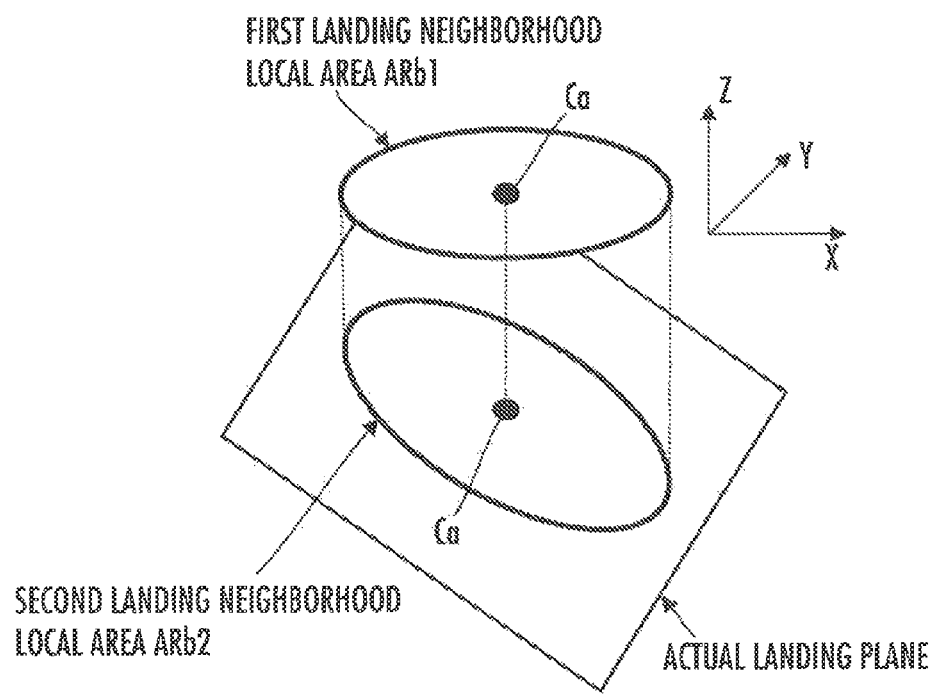
FIG. 14 is an illustration concerning the processing in STEP 36 in FIG. 11.

FIG. 14 illustrates a first landing neighborhood local area ARb1, which is a landing neighborhood local area ARb indicated by the original integrated environment information data, and a second landing neighborhood local area ARb2, which is a landing neighborhood local area ARb after movement obtained by assuming that the landing neighborhood local area ARb was moved from the first landing neighborhood local area ARb1 to a position on the actual landing plane. The first and second landing neighborhood local areas ARb1 and ARb2, as the individual landing neighborhood local areas ARb, have their local environment information differing from each other in one or both of the information about the posture (inclination angle (thx, thy)) and the information about the height of the central point Ca (coordinate position Zc in the Z-axis direction of the central point Ca) of the landing neighborhood local area ARb.

Here, the proper contact surface in a landing neighborhood local area ARb is not necessarily displaced onto the same plane as the actual landing plane in the landing object local area ARa. Therefore, in STEP 36, it is configured such that the local environment information for the landing neighborhood local area ARb includes both of the local environment information corresponding to the first landing neighborhood local area ARb1 and the local environment information corresponding to the second landing neighborhood local area ARb2.

Further, the landing operation restricted mode is, more specifically, an operation mode which is applicable, in the case of causing a moving-side foot 13 or a moving-side hand 23 to land on a given landing neighborhood local area ARb in the vicinity of a landing object local area ARa following the landing of a moving-side foot 13 or hand 23 on the landing object local area ARa, to cause the moving-side foot 13 or the moving-side hand 23 to move in a slower speed than in a normal situation (when the landing operation restricted mode flag is not ON) in such a manner of groping for a landing spot.

The above-described interrupt processing in STEPs 32 to 36 is carried out by the environment information supplementary processing unit 63 every time actual landing of a moving-side foot 13 or a moving-side hand 23 is detected (each time the determination result in STEP 31 becomes positive).

As described above, upon detection of actual landing of a moving-side foot 13 or a moving-side hand 23, the position and posture of the actual landing plane are estimated on the basis of the posture state of the robot 1. Then, when the degree of difference between the position and posture of the actual landing plane and the planned landing plane based on the integrated environment information data is a predetermined threshold value or greater, the local environment information for the local area AR on which the moving-side foot 13 or the moving-side hand 23 has landed is corrected so as to make the local area AR become an area on the actual landing plane.

Therefore, the local environment information for the local area AR can be quickly corrected to conform to the actual state of the contacting object ground surface in the local area AR, without the need to perform measurement in the local area AR with the distance-measuring sensor 46 or the camera 47. Accordingly, the robot 1 can be operated appropriately to cause a moving-side foot 13 or a moving-side hand 23 to land on the local area AR again, even before the measurement processing by the environment information measuring/creating unit 61 is performed again in or near the local area AR.

Supplementally, the local areas AR, of each of the landing object local area ARa and the landing neighborhood landing area ARb after their local environment information being corrected by the interrupt processing in STEPs 32 to 36 and the corresponding local environment information after the correction are deleted, as the deletion objects, from the integrated environment information data, when a local area AR proximate to the local area AR (ARa or ARb) (i.e. proximate local area AR(j) that meets the condition in STEP 14 in FIG. 6 with respect to ARa or ARb) is newly set by the environment information measuring/creating unit 61 at a measurement processing timing after the correction.

A description will now be made about the processing in the robot operation control unit 52 and in the environment information generating unit 51 in the landing operation restricted mode.

During the actual traveling operation of the robot 1, in the case where the robot operation control unit 52 performs operation control of the robot 1 in accordance with a desired gait generated by regarding a local area AR (aforesaid landing neighborhood local area ARb) with the landing operation restricted mode flag set to ON as the planned landing area of a moving-side foot 13 or a moving-side hand 23, the operation control is carried out in the landing operation restricted mode.

Figure 15:
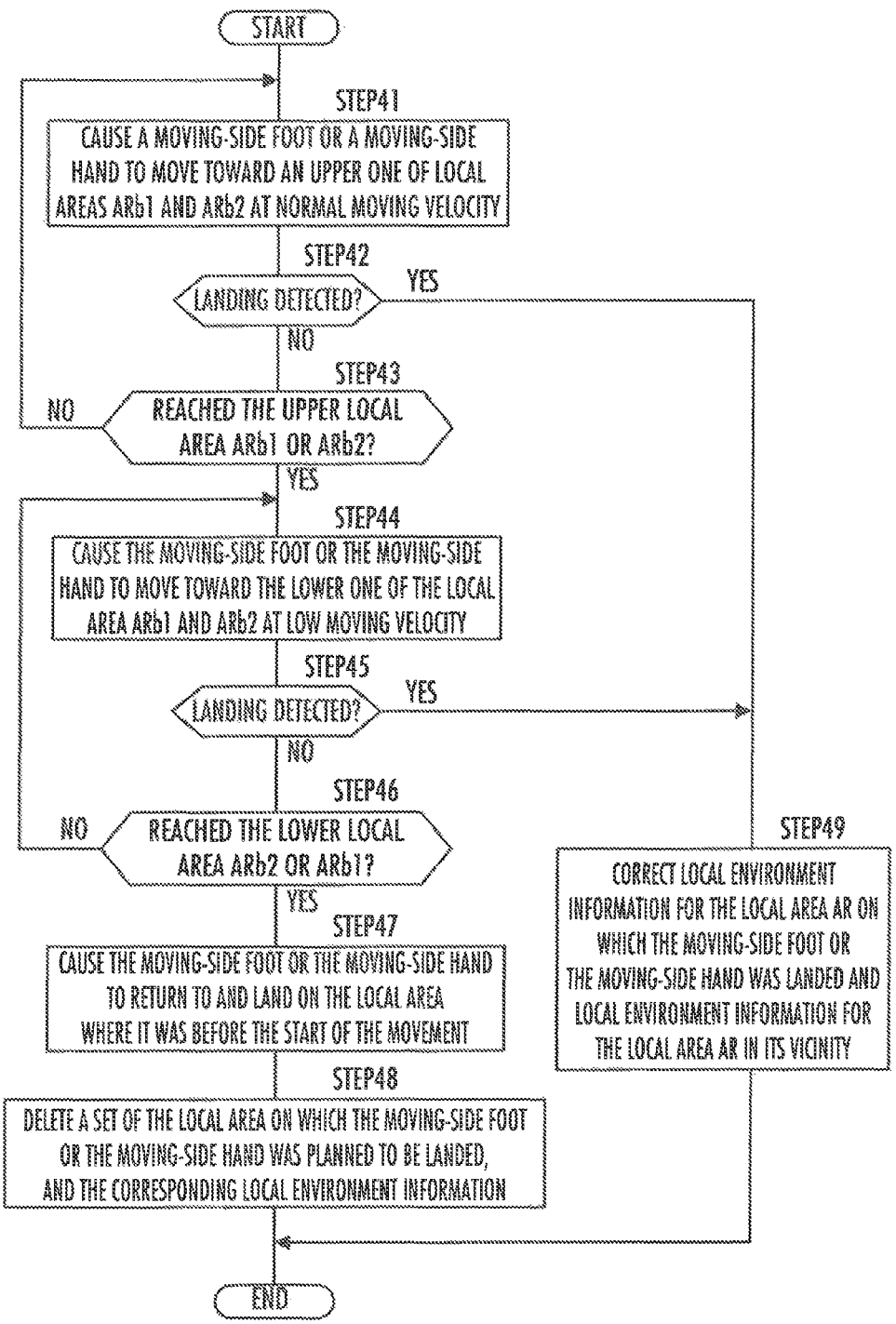
FIG. 15 is a flowchart illustrating the processing performed by an environment information generating unit 51 and a robot operation control unit 52 shown in FIG. 2 in a landing operation restricted mode of the mobile robot.

In this landing operation restricted mode, the processing shown by the flowchart in FIG. 15 is carried out by the robot operation control unit 52 and the environment information supplementary processing unit 63 in the environment information generating unit 51.

The processing in STEPs 41 to 47 is performed by the robot operation control unit 52. In this case, in STEP 41, the robot operation control unit 52 performs control, as shown in FIG. 16, such that a moving-side foot 13 or a moving-side hand 23 that is to be landed on a local area AR with the landing operation restricted mode flag being set to ON moves at a normal moving velocity toward an upper one (ARb1 in FIG. 16) of the first landing neighborhood local area ARb1 and the second landing neighborhood local area ARb2 defined by the local environment information for that local area AR. The normal moving velocity is the same as a moving velocity set by the robot operation control unit 52 when causing a moving-side foot 13 or a moving-side hand 23 to land on a local area AR with the landing operation restricted mode flag being not set to ON.

While causing the moving-side foot 13 or the moving-side hand 23 to move in the above-described manner, the robot operation control unit 52 further performs detection whether the moving-side foot 13 or the moving-side hand 23 has actually landed, and determination whether the moving-side foot 13 or the moving-side hand 23 has reached the upper local area ARb1 or ARb2, successively in STEP 42 and STEP 43, respectively.

In this case, the detection in STEP 42 is performed similarly as in STEP 31 in FIG. 11. The determination processing in STEP 43 is performed by determining whether the operation control of causing the moving-side foot 13 or the moving-side hand 23 to move to a desired position in the upper local area ARb1 or ARb2 has been finished.

At or before the timing when the determination result in STEP 43 becomes positive, when the moving-side foot 13 or the moving-side hand 23 actually lands on the contacting object ground surface, the determination result in STEP 42 becomes positive. In this case, the processing of the landing operation restricted mode is finished via processing in STEP 49 by the environment information supplementary processing unit 63 (described in detail later).

On the other hand, while the moving-side foot 13 or the moving-side hand 23 has not landed yet (while the determination result in STEP 42 remains negative), when the moving-side foot 13 or the moving-side hand 23 reaches a desired position in the upper local area ARb1 or ARb2, then the determination result in STEP 43 becomes positive.

At this time, in STEP 44, the robot operation control unit 52 further performs control, as shown in FIG. 16, such that the moving-side foot 13 or the moving-side hand 23 moves from the position (at present) in the upper local area ARb1 or ARb2 (in FIG. 16, ARb1) of the first and second landing neighborhood local areas ARb1 and ARb2 toward the lower local area ARb2 or ARb1 (in FIG. 16, ARb2) slowly at a moving velocity lower than the normal moving velocity.

While causing the moving-side foot 13 or the moving-side hand 23 to move slowly in this manner, the robot operation control unit 52 further performs detection whether the moving-side foot 13 or the moving-side hand 23 has actually landed, and determination whether the moving-side foot 13 or the moving-side hand 23 has reached the lower local area ARb2 or ARb1, successively in STEP 45 and STEP 46, respectively.

In this case, the detection in STEP 45 is performed similarly as in STEP 31 in FIG. 11. The determination processing in STEP 46 is performed by determining whether the operation control of causing the moving-side foot 13 or the moving-side hand 23 to move to a desired position in the lower local area ARb2 or ARb1 has been finished.

At or before the timing when the determination result in STEP 46 becomes positive, when the moving-side foot 13 or the moving-side hand 23 actually lands on the contacting object ground surface, the determination result in STEP 45 becomes positive. In this case, the processing of the landing operation restricted mode is finished via the processing in STEP 49 by the environment information supplementary processing unit 63.

In the processing in STEP 49, the environment information supplementary processing unit 63 corrects the local environment information for the local area AR (landing object local area ARa) on which the moving-side foot 13 or the moving-side hand 23 has been landed by the operation control in STEP 41 or 44, and the local environment information for its surrounding local area AR (landing neighborhood local area ARb), through the processing similar to the interrupt processing shown by the flowchart in FIG. 11.

In this case, the position and posture of the planned landing plane, to be calculated in STEP 33 in FIG. 11, are calculated on the basis of the local environment information corresponding to the local area ARb1, out of the two local areas ARb1 and ARb2 concerning the local area AR on which the moving-side foot 13 or the moving-side hand 23 has been landed by the operation control in STEP 41 or 44.

In the case where the determination result in STEP 34 becomes negative, the local environment information corresponding to the local area ARb2 is deleted.

The processing in STEP 49 is identical to the processing of the flowchart in FIG. 11 except the above-described processing.

Returning to FIG. 15, while the moving-side foot 13 or the moving-side hand 23 has not landed yet (while the determination result in STEP 45 remains negative), when the moving-side foot 13 or the moving-side hand 23 reaches a desired position in the lower local area ARb2 or ARb1, then the determination result in STEP 46 becomes positive.

In this case, it is highly likely that the state of the contacting object ground surface in the local area AR (with the landing operation restricted mode flag set to ON) that was the planned landing area of the moving-side foot 13 or the moving-side hand 23 has collapsed considerably.

Thus, in this case, in STEP 47, the robot operation control unit 52 causes the moving-side foot 13 or the moving-side hand 23 to move back to the original local area AR where it was before starting the movement, and land on that local area AR again.

Thereafter, the processing in STEP 48 is carried out by the environment information supplementary processing unit 63 in the environment information generating unit 51. In this STEP 48, the environment information supplementary processing unit 63 deletes, from the current integrated environment information data, a set of the local area AR (with the landing operation restricted mode flag set to ON) that was the originally planned landing area of the moving-side foot 13 or the moving-side hand 23 and the local environment information corresponding thereto.

The above has described the processing in the robot operation control unit 52 and the environment information generating unit 51 in the landing operation restricted mode.

The processing performed in the landing operation restricted mode in the above-described manner can prevent the robot 1 from becoming off-balance in the case of causing a foot 13 or a hand 23 of the robot 1 to land on a local area AR with the landing operation restricted mode flag set to ON, i.e. on a local area AR in which the state of the contacting object ground surface may have been collapsed from its original state.

It should be noted that the present invention is not limited to the above-described embodiment. In the above embodiment, the description was made by giving as a representative example the traveling operation in the case of causing a foot 13 or a hand 23 to come into contact with the contacting object ground surface such as a floor or ground surface. However, in the case of causing a hand 23 of the robot 1 to come into contact with a wall surface as appropriate during the traveling of the robot 1, for example, a plurality of local areas may be set, not only on the contacting object ground surface, but also on the wall surface, and the area as a contact object of the hand 23 may be selected from among the local areas set on the wall surface. In this case as well, the local environment information for the local areas on the wall surface can be created and further corrected in a similar manner as with the local areas on the contacting object ground surface.

Further, the operating environment information generating device of the present invention may be one which generates environment information in a form other than the local environment information for a plurality of local areas.

What is claimed is:

1. An operating environment information generating device for a mobile robot which generates, as information for use in operation control of the mobile robot, environment information indicating a spatial arrangement state of a surface portion of an external object existing in an operating environment of the mobile robot, the operating environment information generating device comprising a control device having at least one processor and at least one memory, the at least one memory having stored thereon a program which, when executed by the at least one processor, causes the control device to function as:
    an environment information measuring/creating unit which obtains measurement data according to the spatial arrangement state of the surface portion of the external object existing in a measuring object area in a surrounding of the mobile robot using an external-object recognition sensor mounted on the mobile robot and creates the environment information based on the measurement data;
    a contact-surface position/posture estimating unit which is operable, when the mobile robot comes into contact with an external object during the operation control of the mobile robot based on the environment information created by the environment information measuring/creating unit, to obtain estimated contact-surface position/posture as estimates of an actual position and posture of a contact surface of the mobile robot with the external object based on a posture state of the mobile robot at the time of the contact; and
    an environment information correcting unit which compares position/posture before contact, representing a position and posture before contact with the mobile robot of a portion of the surface portion of the external object corresponding to the contact surface, indicated by the environment information created by the environment information measuring/creating unit before the contact, with the estimated contact-surface position/posture obtained by the contact-surface position/posture estimating unit, and, in a case where a degree of difference between the position/posture before contact and the estimated contact-surface position/posture is a predetermined amount or greater, corrects the environment information in at least the portion corresponding to the contact surface of the surface portion of the external object for which the environment information was created by the environment information measuring/creating unit, in such a way as to conform to the estimated contact-surface position/posture.

2. The operating environment information generating device according to claim 1, wherein the mobile robot includes a foot or a hand as a portion to be brought into contact with the surface portion of the external object, and
    the at least one processor of the operating environment information generating device, when executing the program, causes the control device to function such that processing in the contact-surface position/posture estimating unit and the environment information correcting unit are executed when the foot or the hand comes into contact with the surface portion of the external object by the operation control of the mobile robot.

3. The operating environment information generating device according to claim 1, wherein the environment information created by the environment information measuring/creating unit is configured by local environment information indicating a spatial arrangement state of the surface portion of the external object in a respective one of a plurality of local areas set with respect to the surface portion of the external object.

4. The operating environment information generating device according to claim 3, wherein the at least one processor of the operating environment information generating device, when executing the program, further causes the control device to function as an environment information storing unit which stores a data group including the local environment information in the respective ones of the plurality of local areas, wherein the data group stored in the environment information storing unit includes the local environment information created at different times from one another by the environment information measuring/creating unit.

5. The operating environment information generating device according to claim 4, wherein the environment information storing unit is operable, in a case where a degree of denseness of the local areas in the data group is a predetermined threshold value or higher, to evaluate a degree of reliability of the local environment information in respective ones of a plurality of local areas in an area with the high degree of denseness, and to erase, from the data group, among the plurality of local areas that is determined to be lower in the degree of reliability than the other local areas and the local environment information corresponding to that local area.

6. The operating environment information generating device according to claim 5, wherein the environment information storing unit evaluates the degree of reliability of the local environment information in each local area in the area with the high degree of denseness based on one or more parameters of: time of creation of the local environment information corresponding to the local area, the number of measurement points in which measurement was conducted by the external-object recognition sensor in the local area, dispersion of the measurements obtained by the external-object recognition sensor in the local area, and a distance from the external-object recognition sensor to the local area at a time when the measurement was conducted by the external-object recognition sensor in the local area.

7. The operating environment information generating device according to claim 5, wherein the environment information storing unit sets the threshold value regarding the degree of denseness variably in accordance with a geometry of the surface portion of the external object in the area with the high degree of denseness or in a vicinity thereof.

8. The operating environment information generating device according to claim 3, wherein the local environment information in each local area created by the environment information measuring/creating unit includes information indicating a position and direction of an edge when there is the edge in the local area, and the at least one processor of the operating environment information generating device, when executing the program, further causes the control device to function as an edge information correcting unit which is operable, in a case where a plurality of local areas are set by the environment information measuring/creating unit on a same edge in the surface portion of the external object, to correct the information indicating the position or direction of the edge in each of the plurality of local areas on the edge, in accordance with the information indicating the position or direction of the edge in one or more local areas in a vicinity of the local area, to thereby reduce variation of the information indicating the position or direction of the edge in the respective ones of the local area and the one or more local areas in the vicinity of the local area.

9. The operating environment information generating device according to claim 3, wherein the local environment information in each local area created by the environment information measuring/creating unit includes information indicating a position and direction of an edge when there is the edge in the local area, and the at least one processor of the operating environment information generating device, when executing the program, further causes the control device to function as a corner position estimating unit which is operable, in a case where a plurality of local areas are set by the environment information measuring/creating unit on a respective one of two edges extending in different directions from each other in the surface portion of the external object, to calculate a position of intersection between an extended line of the edge in a local area on one of the two edges and an extended line of the edge in a local area on the other of the two edges, and to estimate the position of intersection as an existence position of a corner in the surface portion of the external object.

* * * * *